(12) United States Patent
Ayers et al.

(10) Patent No.: US 11,766,030 B2
(45) Date of Patent: Sep. 26, 2023

(54) ROBOTIC AQUACULTURE SYSTEM AND METHODS

(71) Applicant: Northeastern University, Boston, MA (US)

(72) Inventors: Joseph Ayers, Nahant, MA (US); Mark Patterson, Salem, MA (US); Jerome F. Hajjar, Newton, MA (US); Milica Stojanovic, Boston, MA (US); Amy Mueller, Somerville, MA (US); Marc Meyer, Boston, MA (US); Scott Sagalow, Palmetto, FL (US)

(73) Assignee: Northeastern University, Boston, MA (US)

( * ) Notice: Subject to any disclaimer, the term of this patent is extended or adjusted under 35 U.S.C. 154(b) by 94 days.

(21) Appl. No.: 16/533,578

(22) Filed: Aug. 6, 2019

(65) Prior Publication Data

US 2020/0068858 A1 Mar. 5, 2020

Related U.S. Application Data

(60) Provisional application No. 62/715,197, filed on Aug. 6, 2018.

(51) Int. Cl.
*A01K 61/10* (2017.01)
*A01K 61/65* (2017.01)
(Continued)

(52) U.S. Cl.
CPC .............. *A01K 61/10* (2017.01); *A01K 61/65* (2017.01); *A01K 61/80* (2017.01); *A01K 61/95* (2017.01); *A01K 63/042* (2013.01); *F03B 13/14* (2013.01)

(58) Field of Classification Search
CPC ........ A01K 61/10; A01K 61/65; A01K 61/80; A01K 61/95; A01K 63/042
(Continued)

(56) References Cited

U.S. PATENT DOCUMENTS 2,128,617 A 8/1938 Lawlor
4,257,350 A 3/1981 Streichenberger
(Continued)

FOREIGN PATENT DOCUMENTS

RU 2479996 C2 * 4/2013 ............. B63J 4/006
WO WO 2009085987 A2 7/2009
(Continued)

OTHER PUBLICATIONS

Agbayani, R.J., "Socioeconomics of tilapia culture in Asia." *SEAFDEC Asian Aquaculture*, 20(2): 14-15, (1998).
(Continued)

*Primary Examiner* — Brady W Frazier
*Assistant Examiner* — Madison Elizabeth Dittner
(74) *Attorney, Agent, or Firm* — Hamilton, Brook, Smith & Reynolds, P.C.

(57) ABSTRACT

Techniques and systems for robotic aquaculture are described. In one embodiment, for example, a mariculture system may include an aquatic animal containment system operative to hold a population of aquatic animals, the aquatic animal containment system comprising an enclosed hull having a receptacle configured to receive a mechanical core, the mechanical core configured to store at least one subsystem to implement at least one function of mariculture system, and a position management system operative to maintain the enclosed hull at a depth below a surface of a body of water. Other embodiments are described.

22 Claims, 17 Drawing Sheets

(51) Int. Cl.
A01K 63/04 (2006.01)
F03B 13/14 (2006.01)
A01K 61/95 (2017.01)
A01K 61/80 (2017.01)

(58) Field of Classification Search
USPC .......................................................... 119/217
See application file for complete search history.

(56) References Cited

U.S. PATENT DOCUMENTS

| | | | |
|---|---|---|---|
| 4,259,926 A * | 4/1981 | Marliave ................ | A01K 61/10 119/208 |
| 4,687,494 A | 8/1987 | Escobal | |
| 4,936,253 A * | 6/1990 | Otamendi-Busto .... | A01K 61/60 119/223 |
| 5,617,813 A | 4/1997 | Loverich et al. | |
| 6,216,635 B1 * | 4/2001 | McRobert .............. | A01K 61/60 119/201 |
| 6,225,965 B1 | 5/2001 | Gilger et al. | |
| 6,481,378 B1 | 11/2002 | Zemach | |
| 7,476,074 B2 | 1/2009 | Jakubowski et al. | |
| 7,650,856 B2 | 1/2010 | Quinta Cortinas et al. | |
| 7,748,349 B2 | 7/2010 | Thorvardarson et al. | |
| 7,992,522 B2 | 8/2011 | Harrison et al. | |
| 8,028,660 B2 * | 10/2011 | Troy ...................... | A01K 61/60 119/223 |
| 8,651,059 B2 | 2/2014 | Cartwright et al. | |
| 9,655,347 B2 * | 5/2017 | Troy ...................... | A01K 61/65 |
| 10,064,396 B2 * | 9/2018 | Lyngoy .................. | A01K 61/95 |
| 10,191,489 B1 * | 1/2019 | Rapoport .............. | A01K 61/80 |
| 10,231,443 B2 * | 3/2019 | Gace ...................... | A01K 61/10 |
| 10,534,967 B2 * | 1/2020 | Atwater ............. | G06K 9/00771 |
| 2005/0120970 A1 * | 6/2005 | Massingill ............. | A01K 63/10 119/216 |
| 2005/0232766 A1 * | 10/2005 | Tsai ..................... | A01K 63/042 415/232 |
| 2006/0018197 A1 * | 1/2006 | Burczynski ............. | G01S 15/96 367/87 |
| 2006/0102087 A1 | 5/2006 | Page | |
| 2008/0110408 A1 * | 5/2008 | Thorvardarson ....... | A01K 61/10 119/223 |
| 2009/0235870 A1 | 9/2009 | Troy | |
| 2010/0018470 A1 | 1/2010 | Kim | |
| 2010/0192868 A1 | 8/2010 | Quinta Cortinas et al. | |
| 2011/0315085 A1 * | 12/2011 | Lindgren ............... | A01K 61/60 119/203 |
| 2012/0006277 A1 | 1/2012 | Troy et al. | |
| 2012/0167829 A1 * | 7/2012 | Madsen .................. | A01K 61/10 119/223 |
| 2012/0184001 A1 * | 7/2012 | Stephen ................. | A01K 61/60 435/134 |
| 2013/0284105 A1 | 10/2013 | Han et al. | |
| 2015/0083050 A1 | 3/2015 | Brosh | |
| 2016/0183501 A1 | 6/2016 | Page | |
| 2017/0072372 A1 * | 3/2017 | Burton .............. | B01F 23/23121 |

FOREIGN PATENT DOCUMENTS

| | | | | |
|---|---|---|---|---|
| WO | WO-2011115616 A2 * | 9/2011 | ............ | A01K 63/042 |
| WO | WO-2016023071 A * | 2/2016 | ............. | A01K 61/90 |
| WO | WO 2016063040 A1 | 4/2016 | | |
| WO | WO 2016128981 A1 | 8/2016 | | |
| WO | WO 2017026899 A1 | 2/2017 | | |
| WO | WO 2017153417 A1 | 9/2017 | | |
| WO | WO-2018074976 A1 * | 4/2018 | ............. | B63J 4/006 |

OTHER PUBLICATIONS

Agnew, D.J., et al.. "Estimating the worldwide extent of illegal fishing," *PloS one*, 4(2): e4570, (2009).

Baerlecken, D., et al., "Bio-Origami: Form Finding and Evaluation of Origami Structures," *Shape Studies*, vol. 1 eCAADe30 497-504 (2012).

Beirao, et al., "Control of the archimedes wave swing using neural networks," *Proceedings of the 7th European Wave and Tidal Energy Conference*, Porto, Portugal, (2007).

Boulet, et al., "Feasibility Study of Closed-Containment Options for tire British Columbia Aquaculture Industry," *Innovation & Sector Strategies Aquaculture Management Directorate Fisheries & Oceans Canada*, Sep. 2010.

Buck, et al., "Meeting the quest for spatial efficiency: progress and prospects of extensive aquaculture within offshore wind farms," *Helgol Mar Res.*, 62:269-281 (2008).

Bullen, et at., "Non-physical fish barrier systems: their development and potential applications to marine ranching," *Rev. in Fish Biol. & Fisheries*, 13:201-212 (2003).

Burtle, et al., Mass Production of Black Soldier Fly Prepupae for Aquaculture Diets, A Manuscript for Aquaculture Int'l, Univ, of Georgia, Tifton Campus, Tifton, GA, (2007).

Cai, et al., "Static behavior of deployable cable-strut structures," *Journal of Constructional Steel Res.*, 119:63-75 (2016).

Chan, et al., "Impacts of Mercury on Freshwater Fish-Eating Wildlife and Humans," *Human and Ecological Risk Assessment*, 9(4):1-17 (2003).

Cheung, et al., "Signature of ocean warming in global fisheries catch," *Nature*, vol. 497 (May 2013).

Chopin, T., Marine Aquaculture in Canada: Well-Established Monocultures of Finfish and Shellfish and an Emergin Integrated Multi-Trophic Aquaculture (IMTA) Approach Including Seaweeds, Other Invertebrates, and Microbial Communities, Fisheries (Jan. 2015).

Conte, F.S., "Stress and the welfare of cultured fish," *Applied Animal Behaviour Science*, 86:205-223 (2004).

Costello, C., et al., "Status and Solutions for the World's Unassessed Fisheries," *Sciencexpress*, (Oct. 2012).

Crab, R., et al., Nitrogen removal techniques in aquaculture for a sustainable production, *ScienceDirect*, 270:1-14 (2007).

Dallinger, R., et al., Contaminated food and uptake of heavy metals by fish: a review and a proposal for further research, Oecologia (Berlin) 73:91-98 (1987).

De Focatiis, et al., "Deployable membranes designed from folding tree leaves," *Philosophical Transactions of The Royal Society a Mathematical Physical and Engineering Sciences*, (Mar. 2002).

Dewailly, E., et al., "Food from the Oceans and Human Health Balancing Risks and Benefits," *Oceanograpy*, 19(2):84-93 (2006).

Duman J., et al., "Freezing resistance in winter flounder *Pseudopleuronectes americanus*," *Nature*, 247:237-238 (1974).

Eshel, G., et al., "Diet, Energy, and Global Warming," *Earth Interactions*, 10(9):1-17 (2006).

Expanding_Mariculture_Farther_Offshore_2010_3012850_1 4829-6783-6315v1.

Filipov, et al., "Origami tubes assembled into stiff, yet reconfigurable structures and metamaterials," PNAS, 112(40):12321-12326 (2015).

Findlay, R., et al., Environmental Impact of Salmon Net-Pen Culture on Marine Benthic Communities in Maine: A case study, Estuaries, 18(1A):145-179 (Mar. 1995).

Foldability_of_hinged-rod_systems_applicable_to_depployable_space_structures_3012851_1 4830-6849-9611v1 CEAS Space J. (2013) 5:157.

Gan, W.W., and Pellegrino S., "A Numerical approach to the Kinematic Analysis of Deployable Structures forming a Closed Loop," Dept. of Engineering, University of Cambridge, UK pellegrino@eng.cam.ac.uk (Mar. 20, 2006).

Gimpel. A., et al., "A GIS modelling framework to evaluate marine spatial planning scenarios: Co-location of offshore wind farms and aquaculture in the German EEZ," *Marine Policy*, 55:102-115 (2015).

Gruber, P., et al., "Deployable structures for a human lunar base," *ScienceDirect*, *Acta Astronautica*, 61:484-495 (2007).

Gudmestad, O., et al. ., "Hydrodynamic Coefficients for Calculation of Hydrodynamic Loads on Offshore Truss Structures," *Marine Structures*, 9:745-758 (1996).

(56) References Cited

OTHER PUBLICATIONS

Halpern, B.S., et al., "Patterns and Emerging Trends in Global Ocean Health," *PLoS ONE*, 10(3): e011863. doi10.1371/journal. pone.0117863.; Mar. 16, 2015.
Harris, et al., "The Chemical Form of Mercury in Fish," *Science*, 301:1203 (2003), www.sciencemag.org on Aug. 26, 2013.
Harvey, D., "Aquaculture Outlook; Domestic Aquaculture Competing Worldwide." *USDA LDP-AQS-24, Electronic Outlook Report from the Economic Research Service*, www.ers.usda.gov, (Oct. 5, 2006).
Helsley, "Hawai'i Open Ocean Aquaculture Demonstration Program," hawauwr99007_3012829_1 4833-8726-6715v1; UNJR Technical Report, No. 28; date not available.
Jalalpour, M., et al., "Optimal design of trusses with geometric imperfections: Accounting for global instability," *Int'l of Solids and Structures*, 48:3011-3019 (2011).
Khan, R.A., "Parasites causing disease in wild and cultured fish in Newfoundland," *Icelandic Agricultural Sciences*, 22:29-35 (2009).
Khuntia, S., et al., "Microbubble-aided water and wastewater purification: a review," *Rev. Chern. Eng. DOI 10.1515/revce-2012-0007*, (2012).
Lafferty, K., et al., "Infectious Diseases Affect Marine Fisheries and Aquaculture Economics," *Annu. Rev. Mar. Sci.*, 7:471-496 (2015).
Leiknes, T., et al., The development of a biofilm membrane biorcactor, *Desalination*, 202:135-143 (2006).
Lines, J., et al., "Safeguarding the welfare of farmed fish at harvest," *Fish Physiol. Biochem*, DOI: 10.1007/s10695-011-9561-5 (Feb. 2012,.
Litvak, M.K., "The development of winter flounder (Pleuronectes americanus) for aquaculture in Atlantic Canada: current status and future prospects," Aquaculture 176 (1999) 55-64.
Lock, E.R., "Insect larvae meal as an alternative source of nutrients in the diet of Atlntic salmon (Salmo salar) postsmolt.," *Aquaculture Nutrition*, doi: 10.1111/anu.12343, 22:1202-1213 (2015).
Lux, F., et al., "Identification of New England Yellowtail Flounder Groups," *Fish and Wildlife Service*, 68(1):1-10 (1961).
Martinez-Martin, et al., "Honeycomb core sandwich panels for origami-inspired deployable shelters: Multi-objective optimization for minimum weight and maximum energy efficiency," Eng. Struct. 69:158-167 (2014).
McCauley, D., et al., "Marine defaunation: Animal loss in the global ocean," Science, Marine Conservation, 347(6219) (Jan. 16, 2015).
McMichael, A.J., "Food, livestock production, energy, climate change, and health," Energy and Health 5, Lanet 370:1253-1263 (2007).
Michler-Cietuch, T., "Marine Aquaculture within Offshore Wind Farms: Social Aspects of Multiple-Use Planning," *GAIA—Ecological Perspectives on Science and Society*, (Jun. 2009).
Mori, T., et al., "Dietary fish as a major component of a weight-loss diet: effect on serum lipids, glucose, and insulin metabolism in overweight hypertensive subjects," *Am. J. Clin. Nutr.*, 70:817-825 (1999).
Morison. J.R., et ah, "Experimental Studies of Forces on Piles," Chapter 25, Coastal Engineering, 340-370 (1950).
Naylor, R., et al., "Aquaculture and Ocean Resources: Raising Tigers of the Sea," *Annu. Rev. Environ. Resour.*, 30:185-218 (2005).
Newton, et al., "Using the Black Soldier Fly, Hermetia Illucens, as a Value-Added Tool for the Management of Swine Manure," Jun. 6, 2005.
Onnis-Hayden, et ah, "Process optimization by decoupled control of key microbial populations: Distribution of activity and abundance of polyphosphate-accumulating organisms and nitrifying populations in a full-scale IFAS-EBPR plant," Water Res., 45:3845-3854 (2011).
Petroski, H., "Deployable Structures," *American Scientist*, 92:122-126 (Mar.-Apr. 2004).
Petrossian. G.A., "Preventing illegal, unreported and unregulated (IUU) fishing: A situational approach," *Biol. Conserv.*, (2015) http://cx.doi.org/10.1016/j.biocon.201 4,09.005).

Pimentel, D., et al., "Sustainability of meat-based and plant-based diets and the environment," Am. *J. Clin. Nutr.*,78(suppl.)660S-663S (2003).
Polinder. H., "Linear PM Generator System for Wave Energy Conversion in the AWS," IEEE Transactions on Energy Conversion, 19(3):583-589 (2004).
Rust, M.B., et al., "Environmental Performance of Marine Net-Pen Aquaculture in the United States," Fisheries, 39(11):508-524 (2014).
Rusten, B., et al., "Design and operations of the Kaldnes moving bed biofilm reactors," *Aquacultural Eng.*, 34:322-331 (2006).
Schenk, M., et al., "Review of Inflatable Booms for Deployable Space Structures: Packing and Rigidization,"*J. Spacecraft & Rockets*, doi 10.2514/1.A32598 (2014).
Shek, J.K.H., et al., "Phase and Amplitude Control of a Linear Generator for Wave Energy Conversion," *Inst. For Energy Systems, School of Engineering and Electronics*, pp. 66-70, (2009).
Sheppard, D. Craig, "Black Soldier Fly Prepupae A Compelling Alternative to Fish Meal and Fish Oil," The National Marine Fisheries Service, Nov. 15, 2007.
Skonberg, D., "Demonstration of Sustainable Cod Farming from Egg to Grow-out in Maine," https://www.researchgate.net/publication/267959213 (Mar. 12, 2015).
Summerfelt, S.T., "A partial-reuse system for coldwater aquaculture," *Aquacultural Engineering*, 31:157-181 (2004).
Tachi, T., "Interactive Form-Finding of Elastic Origami," *Proc. Int'l for Shell & Spatial Structures (IASS) Symposium 2013*, (Sep. 23-27, 2013).
Tachi, T., et al., "Rigid-Foldable Cylinders and Cells," *J. Int'l Assoc. for Shell & Spatial Structures*, 53(4):217-226 (2012).
Tacon, A., et al., "Fishing for Aquaculture: Non-Food Use of Small Pelagic Forage Fish—A Global Perspective," *Rev. Fisheries Sci.*, 17(3):305-317 (2009).
Thiessen, D.L., et al., "Replacement of fishmeal by canola protein concentrate in diets fed to rainbow trout (*oncorhynchus mykiss*)," *Aquaculture Nut.*, 10:379-388 (2004).
Tomberlin, et al., "Protecting the environment through insect farming as a means to produce protein for use as livestock, poultry, and aquaculture feed," *J. Insects as Food & Feed*, 1(4):307-309 (2015).
VaraCorp, Assembly and Installation Instructions, VaraCorp Turbine Aerator; date not available.
Wigley, et al., Length-Weight Relationships for 74 Fish Species Collected dunng NEFSC Research Vessel Bottom Trawl Surveys, 1992-1999, *NOAA Technical Memorandum NMFS-NE-171*, (Mar. 2003).
Zhang, S., et al., "An integrated recirculating aquaculture system (RAS) for land-based fish farming: The effects on water quality and fish production," *Aquacultural Eng.*, 45:93-102 (2011).
Zirbel, S.A., et al., "Accomodating Thickness in Origami-Based Deployable Arrays," Proc. ASME 2013 Int'l Des. Eng. Tech. Conf. & Computers & Information in Eng. Conf., (Aug. 4-7, 2013).
Asadpoure, et al., (2011). "Robust topology optimization of structures with uncertainties in stiffness—Application to truss structures, " Computers & Structures 89(11): 1131-1141.
Bachmann-Vargas, et al., "Re-framing salmon aquaculture in the aftermath of the ISAV crisis in Chile;" Marine Policy 124 (2021) 104358.
Barroso, et al., "The potential of various insect species for use as food for fish," Aquaculture 422-423 (2014), 193-201.
Bekdaş, et al., (2015). "Sizing optimization of truss structures using flower pollination algorithm," Applied Soft Computing 37: 322-331.
Benassai, et al., (2014). "A Sustainability Index of potential co-location of offshore wind farms and open water aquaculture." Ocean & Coastal Management 95: 213-218.
"Beyond Open Net-Pen Aquaculture," SeaChoice.org, retrieved from the Internet at https://www.scachoice.org/beyond-open-nct-pen-aquaculture/ on Feb. 28, 2023.
Brown, et al., (2003). "Larviculture of Atlantic cod (*Gadus morhua*): progress, protocols and problems." Aquaculture 227(1): 357-372.
Brown, et al., (2007). "Demonstration of sustainable cod farming from egg to grow-out in Maine." Report Number: Saltonstall-Kennedy Grant# NA03NMF4270167. University of Maine, Orono, Maine.

(56) References Cited

OTHER PUBLICATIONS

Buhl, et al., (2004). "Shape optimization of cover plates for retractable roof structures," Computers & Structures 82(15): 1227-1236.
Butman, et al., (2009). "Long-Term Oceanographic Observations in Massachusetts Bay, 1989-2006." U.S. Geological Survey Data Series 74; Retrieved from the Internet at https://pubs.usgs.gov/ds/74/.
Castro-González (2008). "Heavy metals: Implications associated to fish consumption," Environmental toxicology and pharmacology 26(3): 263-271.
Cermaq iFarm, "Cermaq towards individual-based farming," Retrieved from the Internet at https://www.ccrmaq.com/wps/wcm/connect/cermaq/news/ifarm-cermaq on Mar. 30, 2018.
Daviglus, M., J. Sheeshka and E. Murkin (2002). "Health benefits from eating fish." Comments on Toxicology 8(4-6): 345-374.
De Sousa Prado, et al., (2006). "Modelling and test results of the Archimedes wave swing," Proceedings of the Institution of Mechanical Engineers, Part A: Journal of Power and Energy 220(8): 855-868.
Denny, M. W. (1995). "Air and water: the biology and physics of life's media," American Scientist, vol. 83, No. 1, p. 91.
Denny, M. W. (2006). "Ocean waves, nearshore ecology, and natural selection." Aquatic Ecology 40(4):439-461.
Dórea, J. G. (2008). "Persistent, bioaccumulative and toxic substances in fish: human health considerations." Science of the Total Environment 400(1): 93-114.
Duman, J. G. and A. L. De Vries (1975). "The role of macromolecular antifreezes in cold water fishes." Comparative Biochemistry and Physiology Part A: Physiology 52(1): 193-199.
Eddy, F. B. and R. D. Handy "Ecological and environmental physiology of fishes," OUP Oxford; Journal of Fish Biology (2013), 82, 1765-1766.
Fredheim, et al., (2009). "Advances in technology for off-shore and open ocean finfish aquaculture." New technologies in aquaculture: Improving production efficiency, quality and environmental management: 914-944.
Guest, J. K. and T. Igusa (2008). "Structural optimization under uncertain loads and nodal locations." Computer Methods in Applied Mechanics and Engineering 198(1): 116-124.
Hardy, R., G. C. Fornshell and E. Brannon (2000). "Rainbow trout culture." Fish Culture: 716-722.
Hardy, R. W. (1996). "Alternate protein sources for salmon and trout diets." Animal Feed Science Technology 59(1): 71-80.
Hasançebi, O. and S. K. Azad (2015). "Adaptive dimensional search: a new metaheuristic algorithm for discrete truss sizing optimization." Computers & Structures 154: 1-16.
Ho-Huu, et al., (2015). "An improved constrained differential evolution using discrete variables (D-ICDE) for layout optimization of truss structures." Expert Systems with Applications 42(20): 7057-7069.
Hoerner, S. (1965). "Fluid Dynamic Drag," Hoerner Fluid Dynamics, Bakersfield, CA.
Holan, A., P.-A. Wold and T. Leiknes (2014). "Intensive rearing of cod larvae (*Gadus morhua*) in recirculating aquaculture systems (RAS) implementing a membrane bioreactor (MBR) for enhanced colloidal particle and fine suspended solids removal." Aquacultural Engineering 58: 52-58.
Hooshmand, A. and M. I. Campbell (2016). "Truss layout design and optimization using a generative synthesis approach." Computers & Structures 163: 1-28.
Howe, A. B. and P. G. Coates (1975). "Winter Flounder Movements, Growth, and Mortality off Massachusetts." Transactions of the American Fisheries Society 104(1): 13-29.
Lee, G. and M. Litvak (1996). "Weaning of metamorphosed winter flounder (*Pleuronectes americanus*) reared in the laboratory: comparison of two commercial artificial diets on growth, survival and conversion efficiency." Aquaculture 144(1): 251-263.
Little, D. and J. Muir (1987). A guide to integrated warm water aquaculture, Institute of Aquaculture.

Lowther, A. and M. Liddel (2015). Fisheries of the United States: Current Fishery Statistics Silver Spring, MD National Marine Fisheries Service Office of Science and Technology.
Majed, et al., (2008). "Phosphorous Removal Kinetics and Operational Issues with a Lab-Scale Advanced IFAS-EBPR-MBR Process," Proceedings of the Water Environment Federation 2008(17): 83-103.
McConnell, "2022 could be the beginning of the end for open-net fish farms in Canada;" Feb. 25, 2022, Retrieved from the Internet at https://scienceline.org/2022/02/2022-could-be-the-beginning of-the-end-for-open-net-fish-farms-in-canada/.
Menendez, A. and G. Paillet (2008). "Fish inspection system using a parallel neural network chip and the image knowledge builder application." AI Magazine 29(1): 21.
Tacon, et al., (2009). "Fishing for feed or Fishing for Food: Increasing Global Competition for Small Pelagic Forage Fish." AMBIO: A Journal of the Human Environment 38(6): 294-302.
Meyer, M. H. and F. G. Crane (2015). "Venturing: Innovation and Business Planning for Entrepreneurs," Boston, MA, Institute for Enterprise Growth.
Morison, et al., (1950). "Petroleum Transaction, AIME 189, 149; 157. " The force exerted by surface waves on piles.
Murray, A. G. (2013). "Epidemiology of the spread of viral diseases under aquaculture." Current opinion in Virology 3(1): 74-78.
Naylor, et al., (2005). "Fugitive Salmon: Assessing the Risks of Escaped Fish from Net-Pen Aquaculture." Bioscience 55(5): 427-437.
Obrębski, J. and R. Tarczewski "Interactive Form-Finding of Elastic Origami." Proceedings of the International Association for Shell and Spatial Structures (IASS) Symposium 2013 "Beyond the Limits of Man," Sep. 23-27, Wroclaw University of Technology, Poland.
Page, S. H. (2013). Aquapod Systems aquaculture Aquapod systems for Sustainable Ocean Aquaculture Aquaculture. Sustainable Food Production, Springer: 223-235.
Palmer, M. (2014). "Assessment update report of the Gulf of Maine Atlantic cod stock." United States Department of Commerce, Northeast Fisheries Science Center Reference Document: 14-14.
Parmar, et al., (2013) "Microbubble generation and microbubble-aided transport process intensification—A state-of-the-art report." Chemical Engineering and Processing: Process Intensification 64: 79-97.
Pearcy, W. (1961). "Seasonal Changes in Osmotic Pressure of Flounder Sera." Science 134(3473): 193-194.
"Is deep-water aquaculture the way for salmon farmers to beat sea lice?" Responsible Seafood Advocate, Jan. 26, 2023.
Richardson, et al., (2015). "Robust topology optimization of truss structures with random loading and material properties: A multiobjective perspective." Computers & Structures 154: 41-47.
Rumpold, B. A. and O. K. Schlüter (2013). "Potential and challenges of insects as an innovative source for food and feed production." Innovative Food Science & Emerging Technologies 17: 1-11.
Sankar, et al., (2006). "Distribution of organochlorine pesticides and heavy metal residues in fish and shellfish from Calicut region, Kerala, India." Chemosphere 65(4): 583-590.
Sapkota, et al., (2008). "Aquaculture practices and potential human health risks: Current knowledge and future priorities." Environment international 34(8): 1215-1226.
Silvert, W. (1992). "Assessing environmental impacts of finfish aquaculture in marine waters," Aquaculture 107(1): 67-79.
Silvert, W. and J. Sowles (1996). "Modelling environmental impacts of marine finfish aquaculture," Journal of Applied Ichthyology 12(2): 75-81.
Smigielski, A. S. (1975). "Hormone-Induced Spawnings of the Summer Flounder and Rearing of the Larvae in the Laboratory." The Progressive Fish-Culturist 37(1): 3-8.
Stickney, R. R. (1979). Principles of warm water aquaculture, John Wiley & Sons.
Sun, et al., (2010). "Development of a biofilm-MBR for shipboard wastewater treatment: The effect of process configuration." Desalination 250(2): 745-750.
Thrall, A. and C. Quaglia (2014). "Accordion shelters: A historical review of origami-like deployable shelters developed by the US military." Engineering Structures 59: 686-692.

(56) References Cited

OTHER PUBLICATIONS

"Tierra del Fuego Province bans salmon farming in open-net pens;" Argentina Feb. 7, 2021; Retrieved from the Internet at https://www.batimes.com.ar/news/argentina/tierra-del-fuego-makes-argentina-first-country-to-ban-salmon-farming.phtml on Feb. 28, 2023.

Tootkaboni, et al., (2012). "Topology optimization of continuum structures under uncertainty—A polynomial chaos approach." Computer Methods in Applied Mechanics and Engineering 201: 263-275.

Vu, K., J. R. Liew and K. Anandasivam (2006). "Deployable tension-strut structures: from concept to implementation." Journal of Constructional Steel Research 62(3): 195-209.

Walker, C. H. and D. R. Livingstone (2013). Persistent pollutants in marine ecosystems, Elsevier.

Wang, H. and H. Ohmori (2013). "Elasto-plastic analysis based truss optimization using Genetic Algorithm," Engineering Structures 50: 1-12.

White, C. R. (2011). "Allometric estimation of metabolic rates in animals." Comparative Biochemistry and Physiology Part A: Molecular & Integrative Physiology 158(3): 346-357.

Wong, et al., (2001). "Heavy Metal Concentrations in Marine Fishes Collected from Fish Culture Sites in Hong Kong." Archives of Environmental Contamination and Toxicology 40(1): 60-69.

Wu, X. Y. and Y. F. Yang (2010). "Accumulation of heavy metals and total phosphorus in intensive aquatic farm sediments: comparison of tilapia Oreochromis niloticus, Oreochromis aureu, Asian seabass Lates calcarifer and white shrimp Litopenaeus vannamei farms." Aquaculture Rescarch 41(9): 1377-1386.

You, Z. and S. Pellegrino (1997). "Foldable bar structures." International Journal of Solids and Structures 34(15): 1825-1847.

Young, K. (2009). "Omega-6 (n-6) and omega-3 (n-3) fatty acids in tilapia and human health: a review." International journal of food sciences and nutrition 60(sup5): 203-211.

Zhao, et al., (2014). "Structural Dynamics of Planar Linkages. Design of Special Planar Linkages," Springer: 159-215.

Zhao, et al., (2009). "The mechanism theory and application of deployable structures based on SLE." Mechanism and Machine Theory 44(2): 324-335.

Datashvili, "Foldability of hinged-rod systems applicable to deployable space structures," CEAS Space Journal 5, 157-168 (2013).

Abdelrahman, et al., "Testing micro-nanobubble generating device at different salinities," Global Seafodo Alliance, Feb. 7, 2016.

Endo, et al., "DO-increasing effects of a microscopic bubble generating system in a fish farm," Matine Pollution Bulletin, vol. 57, Issues 1-5, 2008, pp. 78-85.

"Advantages of Micro bubble in Fish Farming," Agriculture, Technology, and Business Market, Nov. 17, 2016.

"Sabah's future prosperity lies in seafood, aquaculture," the fish site, May 4, 2006; Retrieved from the Internet at https://thefishsite.com/articles/sabah39s-future-prosperity-lies-in-seafood-aquaculture on Apr. 19, 2023.

\* cited by examiner

ROBOTIC AQUACULTURE SYSTEM AND METHODS

CROSS-REFERENCE TO RELATED APPLICATIONS

This application claims the benefit of and priority to U.S. Provisional Patent Application No. 62/715,197, filed on Aug. 6, 2018, the entire contents of which are incorporated by reference.

TECHNICAL FIELD

Embodiments herein generally relate to autonomous or semi-autonomous robotic aquaculture systems and, more particularly, structural systems and operating systems for implementing a robotic closed aquaculture system.

BACKGROUND

Aquaculture involves the farming of plants or animals in aquatic environments. For example, a mariculture system may involve farming one or more fish, mollusk, crustaceans, and/or the like species in a body of saltwater. Conventional mariculture systems have multiple negative impacts on the local environment, such as being navigational hazards, an eyesore for water-front property owners, and generating a considerable amount of waste. For mariculture operators, conventional systems are capricious investments because they are exposed to environmental conditions, such as storm-wave disruptions, toxins, disease, invasive species, parasites, and/or the like, that lead to stock losses and/or increased operating costs.

DETAILED DESCRIPTION

Figure 1:
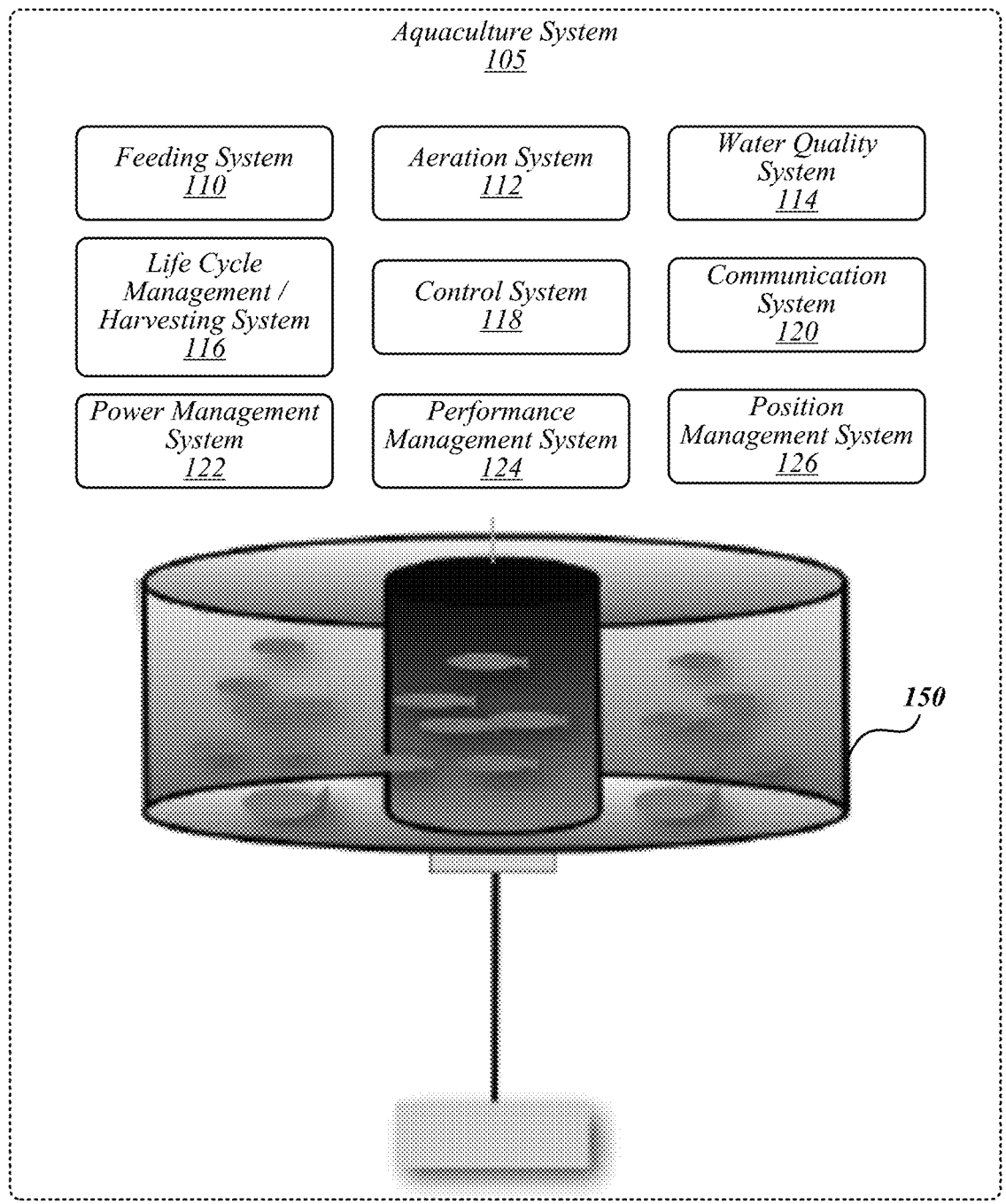
FIG. 1 illustrates an embodiment of a first operating environment.

Various embodiments may generally be directed toward systems, methods, and/or apparatus for an aquaculture system. In some embodiments, the aquaculture system may be or may include a mariculture system configured to operate in a saltwater environment, such as the ocean. Although mariculture and mariculture systems are described in certain examples, embodiments are not so limited, as the aquaculture systems according to some embodiments may operate in any aquatic environment including, without limitation, freshwater, saltwater, brackish water, ponds, lakes, rivers, reservoirs, oceans, seas, bays, harbors, pools, and/or the like. Embodiments are not limited in this context.

In some embodiments, an aquaculture system may be or may include a submergible, self-contained, autonomous (or semi-autonomous) system. For example, the aquaculture system may include a tank or hull that would be closed or semi-closed to the external environment and suspended in a frame. A central mechanical core may house various components used for operating the aquaculture system including, without limitation, an anchoring winch, a wave energy power supply, a recirculating aeration system, a smart autonomous feeding system, a water quality management system, a monitoring or control system, and/or the like. In some embodiments, the control system may communicate with a shore-based operator and process control system, for instance, using sonar, radio frequency (RF) protocols, and/or other types communication protocols.

In some embodiments, the water quality management system may remove solid and/or dissolved wastes, eliminating negative environmental impacts. The closed nature of the aquatic system may operate to eliminate exposure to harmful conditions, such as ambient disease, parasites, predators. A mooring (or anchor) and winch system may operate to suspend the aquatic system at a certain depth below the water surface which may, for example, eliminate certain drawbacks of conventional systems, such as negative visual impacts and navigational hazards. The aquatic system may be moved to various depths such as during storms to mitigate catastrophic failure and/or to maximize yield by placing the system at optimal temperatures in the thermocline, which will change during fish grow-out.

The aquatic system may be controlled by a control system, for example, implemented as an electronic nervous system that may use principles of the nervous system to maintain homeostasis. In various embodiments, a location system, such as a vestibular-like system, may monitor the inclination and accelerations of the aquatic system to modulate both a distributed variable buoyancy system to maintain stability in the pitch, roll, and yaw planes and the winch system to regulate descent to minimize perturbations due to wave action as well seek optimal temperature and stability conditions for growth.

In exemplary embodiments, chemical sensors may be used to manage the waste mitigation and aeration subsystems to maintain water quality, for instance, optimal for anabolic metabolism. In some embodiments, cameras or other detection devices may monitor fish activity, such as fish movements, in the tank and may control the feeding system based on various feeding factors, such as time of day, allometrically-scaled ration based on daily size estimation, in response to fish interactions (e.g., schooling, aggression), and/or the like. In various embodiments, food may be based on various factors, such as insect protein derived from waste vegetable produce (for example, amended with fish gurry to enhance Omega-3 production), with special formulation to reduce bulk and promote anabolism, pelletized and dispensed from vacuum-packed strips. Operating information, including, without limitation, animal movement, size, and water quality information, may be communicated to the surface through various image and sensor based communications technologies, and, for example, relayed through satellite or cell transmission to shore command and control.

A control system will gather operating data in real-time or substantially real-time and be programmed to automatically issue alerts, adjust devices (for instance, pumps, winches, feeding devices), initiate specific workflows for maintenance, emergency repair, and/or the like, as well as provide historical tracking of operations and production results for equipment managers and owners.

Operations within the aquatic system may be continuously monitored with sensing instrumentation and signal/data processing modules for real-time control of water quality. For example, high resolution measurement of nutrients (NH3, NO3-), oxygen (DO), turbidity, and a range of other bulk parameters (e.g., pH, conductivity) considered critical to sustain healthy fish may be monitored. Non-limiting examples of sensors may include potentiometric, ampiometric, voltammetric, and optical fluorescence-quenching sensors which are small and have very low power requirements. Signals from sensors may be processed through trained processes, algorithms, and/or the like that retrieve meaningful measurements for key water quality parameters from noisy sensor data (that often experiences interferences from other analytes in the water). Feedback from chemical sensors may be used to modulate flow rates over biofilm remediators as well as the operation of the aeration system. The aquatic system may include embedded controls that are instantiated on a relatively low power processor board running control software (for example, LabVIEW), which may be for various functions including, without limitation, to mediate flows between the main water tank and the water treatment module, to ensure aeration at the appropriate level, actuate pumps controlling circulation currents in the tank to ensure consistent oxygenation of the water as well as positive conditions for the fish, and/or the like. This operating information may be stored in a data store. Aquatic systems according to some embodiments may be scalable, for example, with N tanks, each with continuous monitoring, all supplying information to a central command and control system.

In this description, numerous specific details, such as component and system configurations, may be set forth in order to provide a more thorough understanding of the described embodiments. It will be appreciated, however, by one skilled in the art, that the described embodiments may be practiced without such specific details. Additionally, some well-known structures, elements, and other features have not been described in detail, to avoid unnecessarily obscuring the described embodiments.

In the following description, references to "one embodiment," "an embodiment," "example embodiment," "various embodiments," etc., indicate that the embodiment(s) of the technology so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

FIG. 1 illustrates an example of an operating environment 100 that may be representative of some embodiments. As shown in FIG. 1, aquaculture system 105 may include various systems or sub-systems to implement functions thereof. Non-limiting examples of systems or sub-systems may include an aquatic animal containment system 150, a feeding system 110, an aeration system, a water quality system, a harvesting system 116, a control system 118, a communication system 120, a power management system 122, a performance management system 124, and/or a location management system 126.

Figure 2:
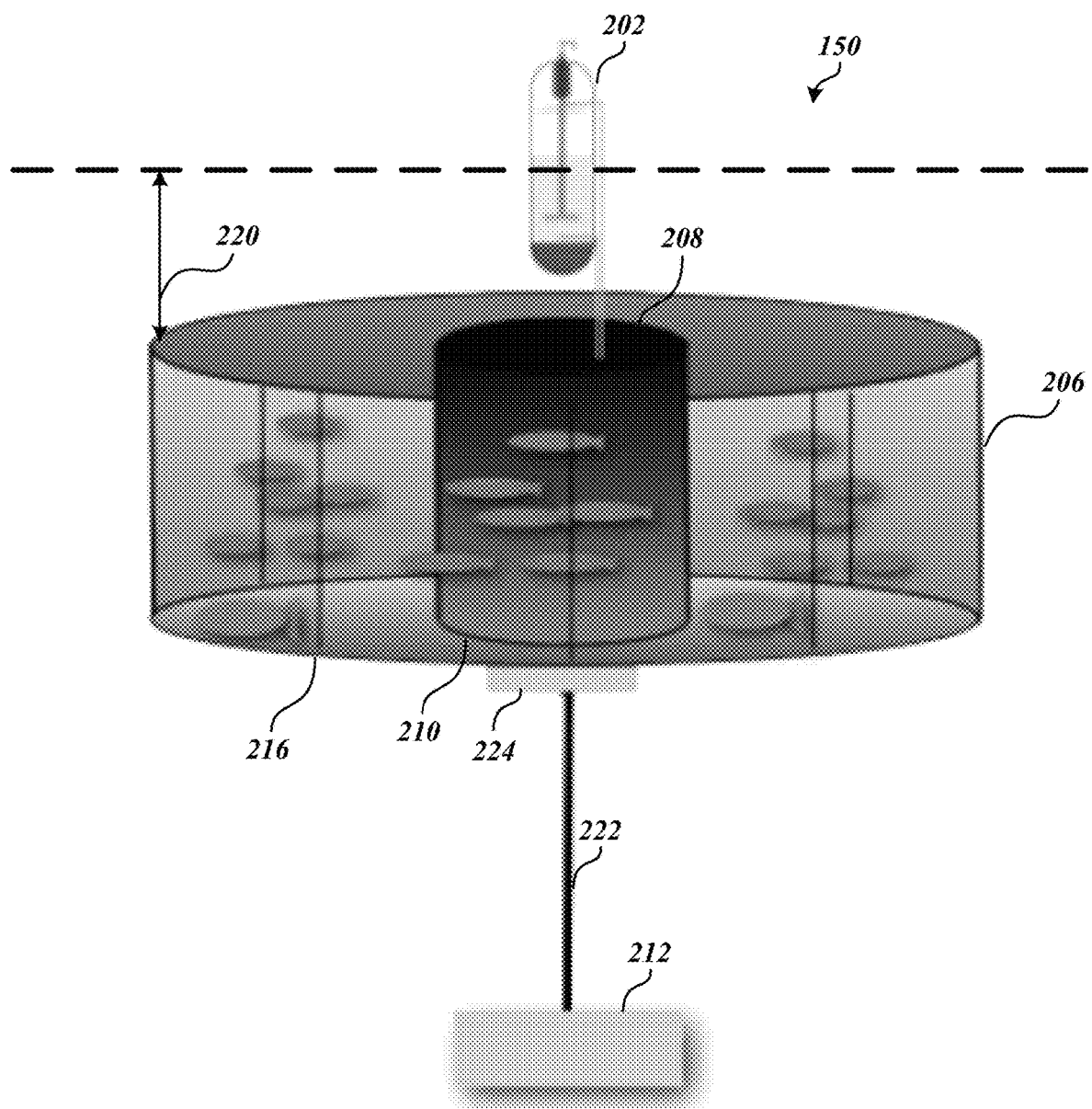
FIG. 2 illustrates an embodiment of a second operating environment.

Aquatic animal containment system 150 may include physical structures configured to contain animals, such as fish, mollusks, crustaceans, and/or the like for farming via aquaculture system. FIG. 2 depicts an aquatic animal containment system 150 according to some embodiments. As shown in FIG. 2, an illustrative aquatic animal containment system 150 may include an aeration system 202, hull or tank 206, mechanical core 208, receptacle 210, moor or anchor 212, mooring cable 222, and/or winch 224.

Hull 206 may be configured to hold a population of animals. Hull 206 may be maintained in the shape of a rectangular toroid by using a deployable space truss, skeleton, or tubing structure 216 (see, for example, FIGS. 5A-5E) that defines an outer containment ring and an inner receptacle 210 for a mechanical core 208. In some embodiments, hull 206 may be formed of a non-permeable material (for example, such that external water does not enter the tank via the surfaces thereof). A non-limiting example of a non-permeable material may be Kevlar™, such as plasticized Kevlar™. In various embodiments, hull 206 may be or may include a closed containment structure formed from a rubberized bladder. In exemplary embodiments, hull 206 may be formed from a polymer material, such as polymer fibers/fabrics, polyvinyl chloride (PVC), polyester fabric, combinations thereof (for example, PVC impregnated polyester fabric), variations thereof, and/or the like.

A rectangular toroid can be used to create a circular raceway through which the fish can constantly swim, and at equilibrium cause movement of the water to get the activity necessary for proper health and rapid growth. Loop channels may be used at selected locations to integrate the tubing structure with the bladders. Clear (polyester) panels may be integrated into the top and sides of the bladder to allow entry of ambient light.

Figure 3:
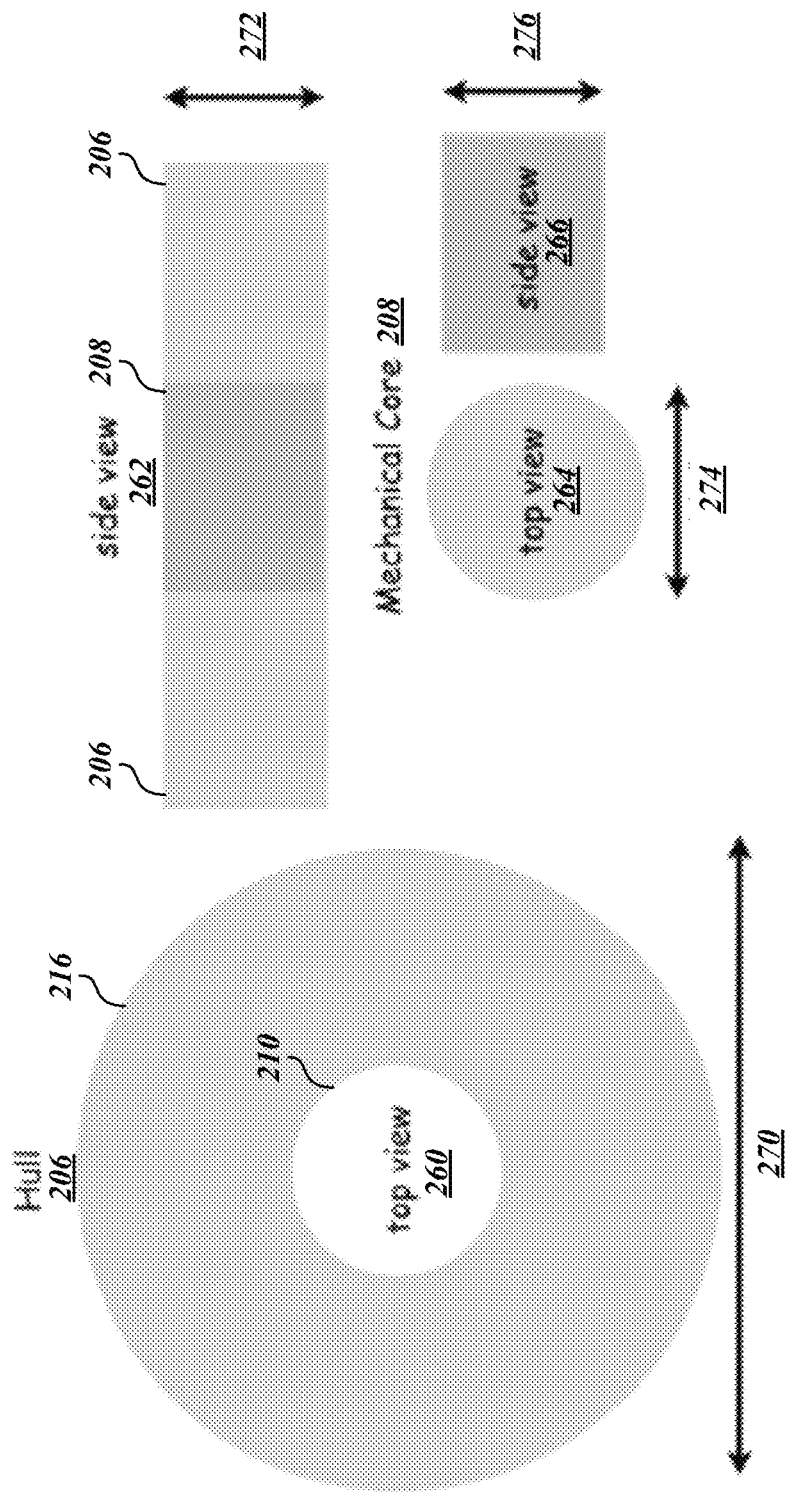
FIG. 3 illustrates an embodiment of an aquaculture system.

FIG. 3 depicts various views of components of aquatic animal containment system according to some embodiments. In particular, FIG. 3 depicts a top view 260 and a side view 262 of hull 206, and a top view 264 and a side view 266 of mechanical core 208. In various embodiments, hull 206 may have a width 270 and a height 272, and mechanical core 208 may have a width 274 and a height 276. In some embodiments, width 270 may be about 60 ft and height 272 may be about 15 ft. In some embodiments, width 274 may be about 20 ft and height 276 may be about 15 ft. In various embodiments, width 270 and/or width 274 may be about 10 ft, about 20 ft, about 30 ft, about 40 ft, about 50 ft, about 60 ft, about 70 ft, about 80 ft, about 90 ft, about 100 ft, about 200 ft, about 500 ft, and any value or range between any two of these values (including endpoints). In various embodiments, height 272 and/or height 276 may be about 4 ft, about 6 ft, about 8 ft, about 10 ft, about 12 ft, about 15 ft, about 20 ft, about 30 ft, about 50 ft, about 100 ft, about 200 ft, about 500 ft, and any value or range between any two of these values (including endpoints).

Referring to FIGS. 2 and 3, in some embodiments, truss 216 may include a central inner cylindrical receptacle 210 operative to receive and support modules comprising the mechanical core 208. The geometric configuration of the truss 216 may be configured to provide a structure that can be readily folded, transported, assembled and deployed, and allow the structure to be manufactured, folded, transported to the deployment site, and unfolded, followed by insertion of mechanical core 208, and deployed. In some embodiments, truss 216 may be integrated with the bladder tank. In some embodiments, truss 216 may be formed of tubes, cables, and/or other structures of various materials, such as carbon fiber, aluminum, or other corrosion resistant materials. In some embodiments, truss 216 may be assembled completely before shipping, reducing the amount of labor required during deployment.

In various embodiments, mechanical core receptacle 210 may be formed of a cylindrical structure assembled with corrosion resistant aluminum or carbon fiber members, reinforced by horizontal elements at the top and bottom. In some embodiments, a mooring winch 224 may be attached at the bottom of aquatic animal containment system 150, for example, to hull 206 and/or receptacle 210. In various embodiments, a hatch door on top of aquatic animal containment system 150 may be included to allow access to hull 206 and/or mechanical core 208. A platform attached to the top of aquatic animal containment system 150, such as to the top of hull 206 and/or receptacle 210 may provide a working area for workers tending to the system. In various embodiments, the sides of the mechanical core 208 may be open to facilitate the installation and/or maintenance of equipment. Mechanical core 208 may be formed from various materials, including polypropylene (for instance, high-density polypropylene). Mechanical core 208 may be configured to house and/or support various components used in the operation of aquatic animal containment system 150 including, without limitation, power supplies, anchor systems, sensors and control electronics, bioreactors, feeding systems, and pumps, and/or the like. Physical interconnects (for instance, water, air, chemical sensors, etc.) may occur at a rigid plate embedded in the bladder fabric of mechanical core 208 which, for example, may allow for rapid change-out on site in the case of a failure. In one embodiments, as described in more detail herein, mechanical core 208 may have two flooded compartments to house components, such as an Archimedes wave swing, an aerator, and associated control hardware.

Figure 4:
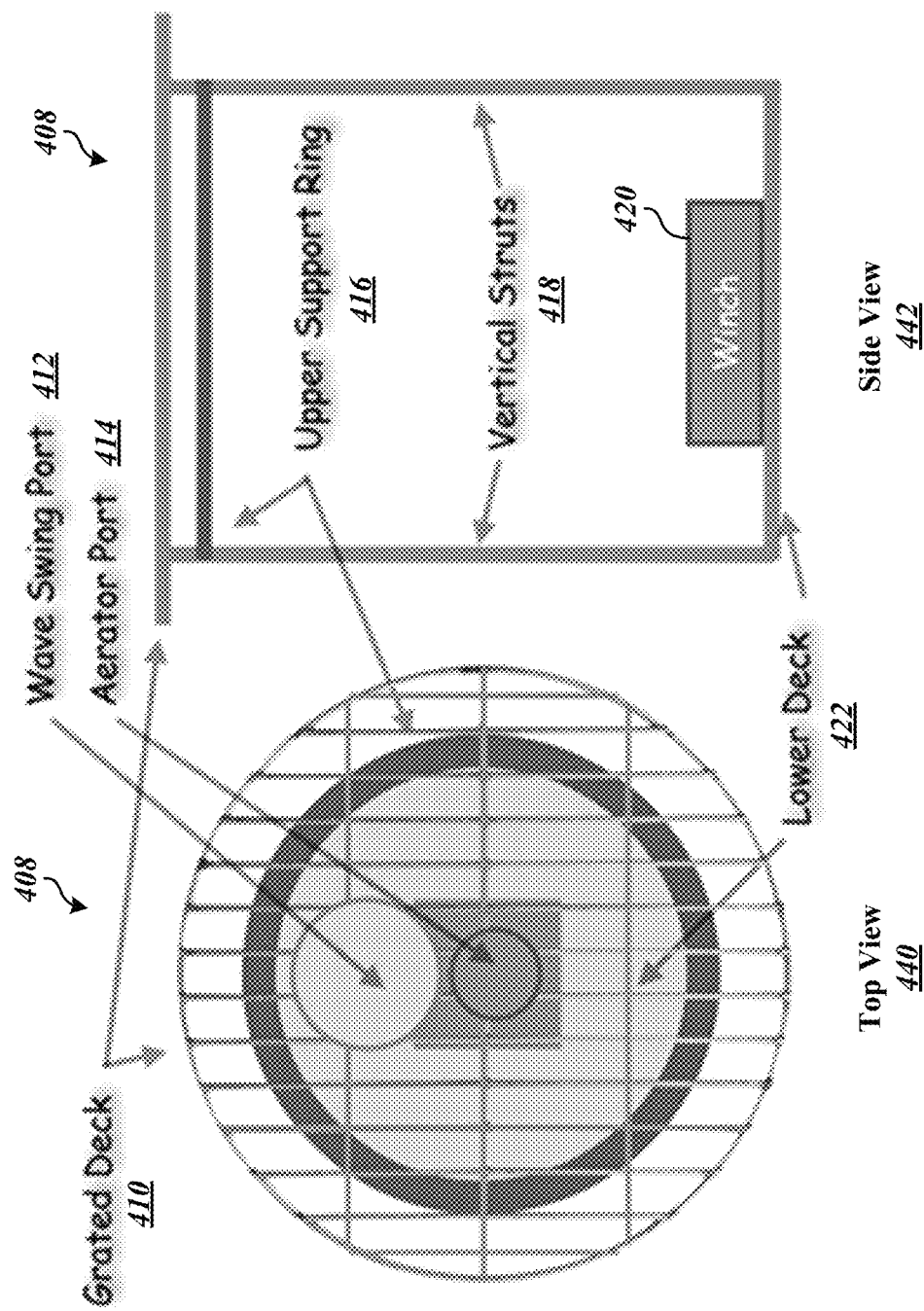
FIG. 4 illustrates an embodiment of an enclosed aquaculture system.

FIG. 4 depicts a top view 440 and a side view 442 of a mechanical core 408 according to some embodiments. A grated deck 410 may be arranged over mechanical core 408 (and at least a portion of grated deck 410 may extend over hull) to allow operators to access the system, for example, from a tender. Mechanical core 408 may include a lower deck 422, support rings 416, such as an upper support ring, and vertical struts 418. Various ports or other openings may be arranged in mechanical core 408, such as a wave swing port 412, and aerator port 414, and/or the like.

Mechanical core 408 may be formed of a modular configuration including circular lower deck 422 that would support various components, such as a winch 420 and anchor system, with vertical struts 418 to upper support ring 416 that would support metal grate decking 410 with hatches and ports 412, 414 to access the central volume. Within the central volume there may be a series of sliding channels that allow individual components and systems (feeding system, aerator, wave swing, and/or the like) to be mounted and readily changed out as necessary. In some embodiments, the space frame structures that may support hull 206 may be attached to portions of mechanical core 408 and its support structures, such as lower deck 422 and/or upper support ring 416. In various embodiments, grated deck 410 may be exposed by buoyancy systems that would elevate the entire system and allow operators to access system modules.

Figure 5A:
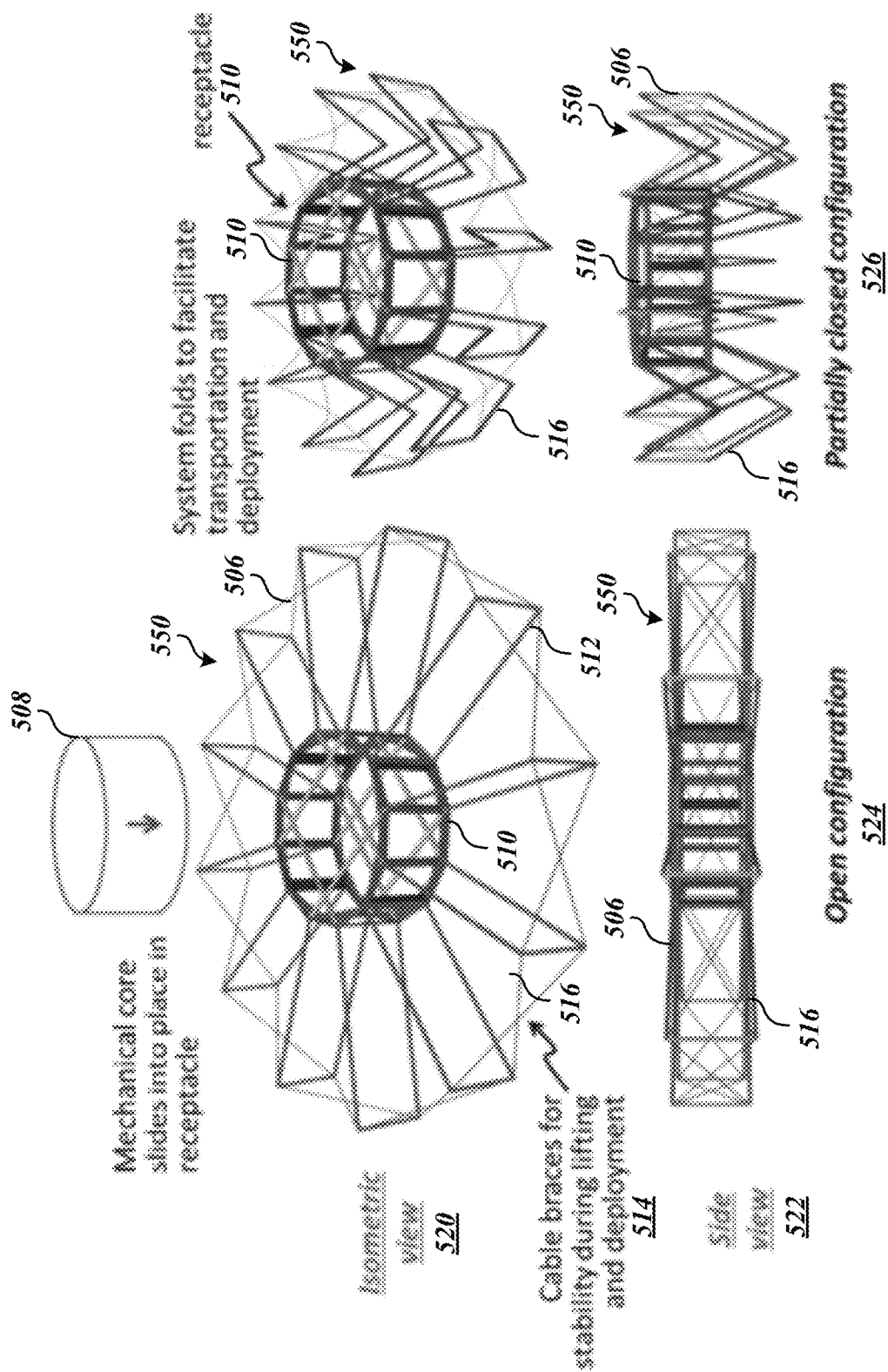
FIGS. 5A-5E depict embodiments of an enclosed aquaculture system.
Figure 5B:
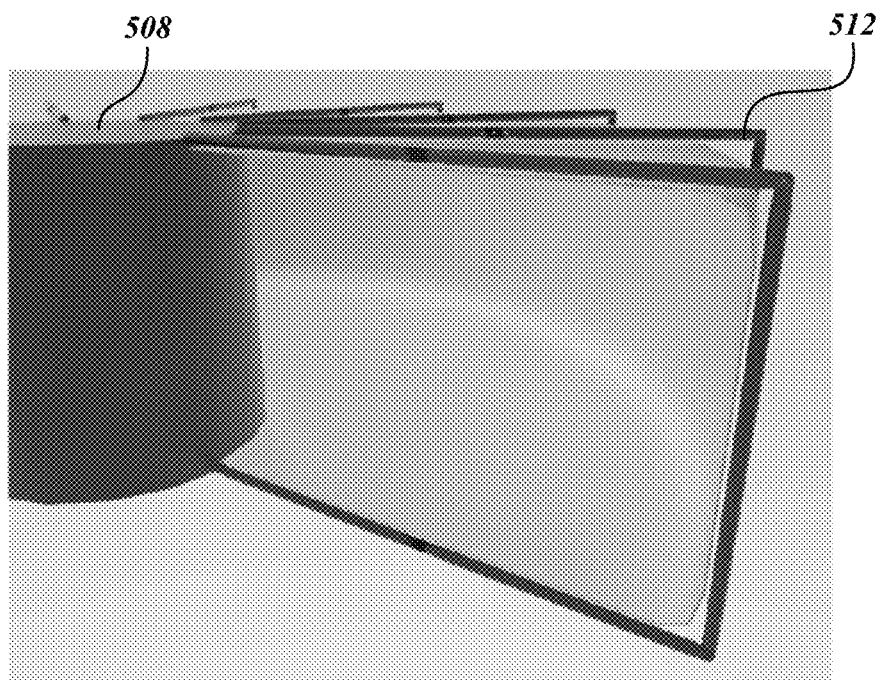
Figure 5C:
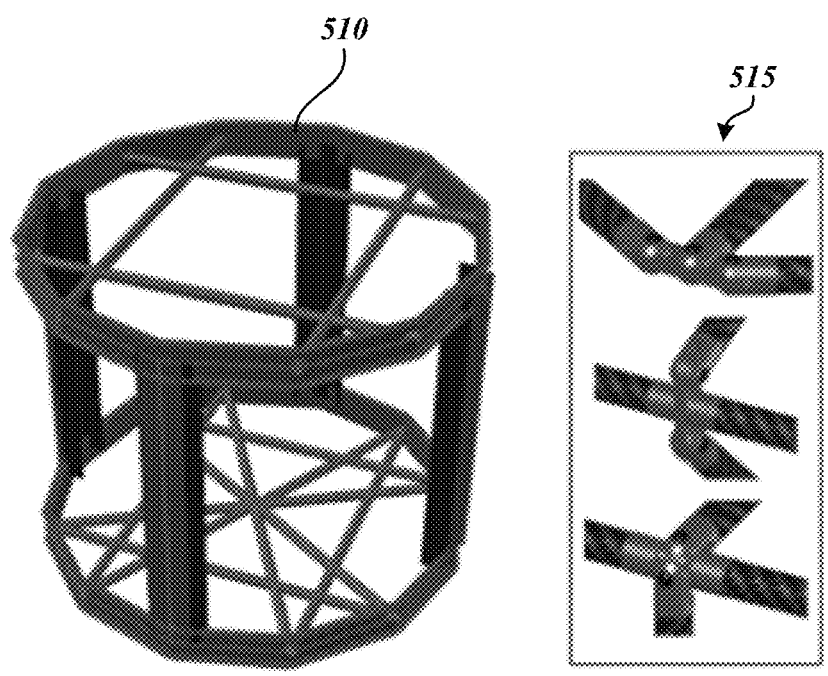

FIGS. 5A-5E depict various configurations of an aquatic animal containment system according to some embodiments. FIG. 5A depicts an isometric view 520, a side view 522, an open configuration 524, and a partially closed configuration 526 of an "umbrella" embodiment of an aquatic animal containment system 550. As shown in FIG. 5A, aquatic animal containment system 550 may include a hull 506 and a receptacle 510 configured to receive a mechanical core 508. Hull 506 may be formed of a truss system 516 of tubes, cables, and/or other structures of various materials, such as carbon fiber, aluminum, or other corrosion resistant materials. For example, hull 506 may be formed of a truss system of cables 514 and fins 512. Referring to FIG. 5B, therein is depicted an illustrative fin 512 according to some embodiments. Referring to FIG. 5C, therein is depicted an illustrative receptacle 510 with hinged connections 515 (three-hinged connections) according to some embodiments.

Figure 5D:
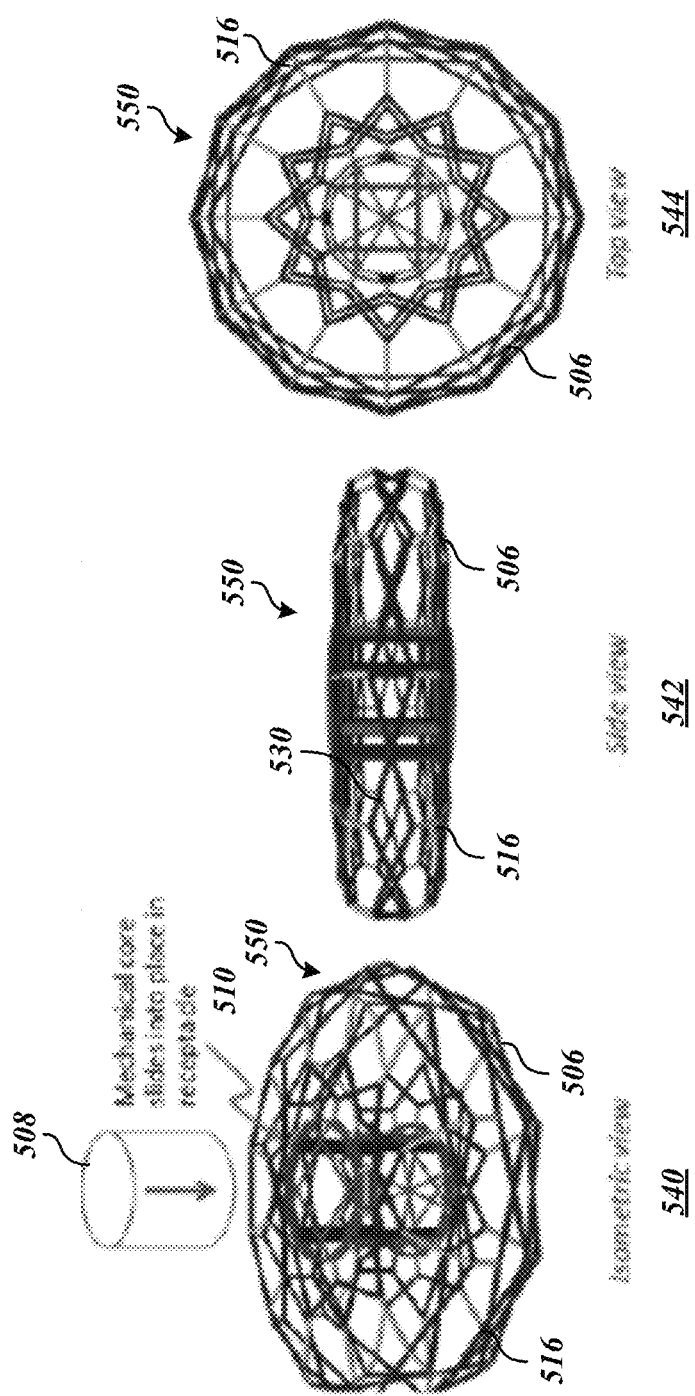
Figure 5E:
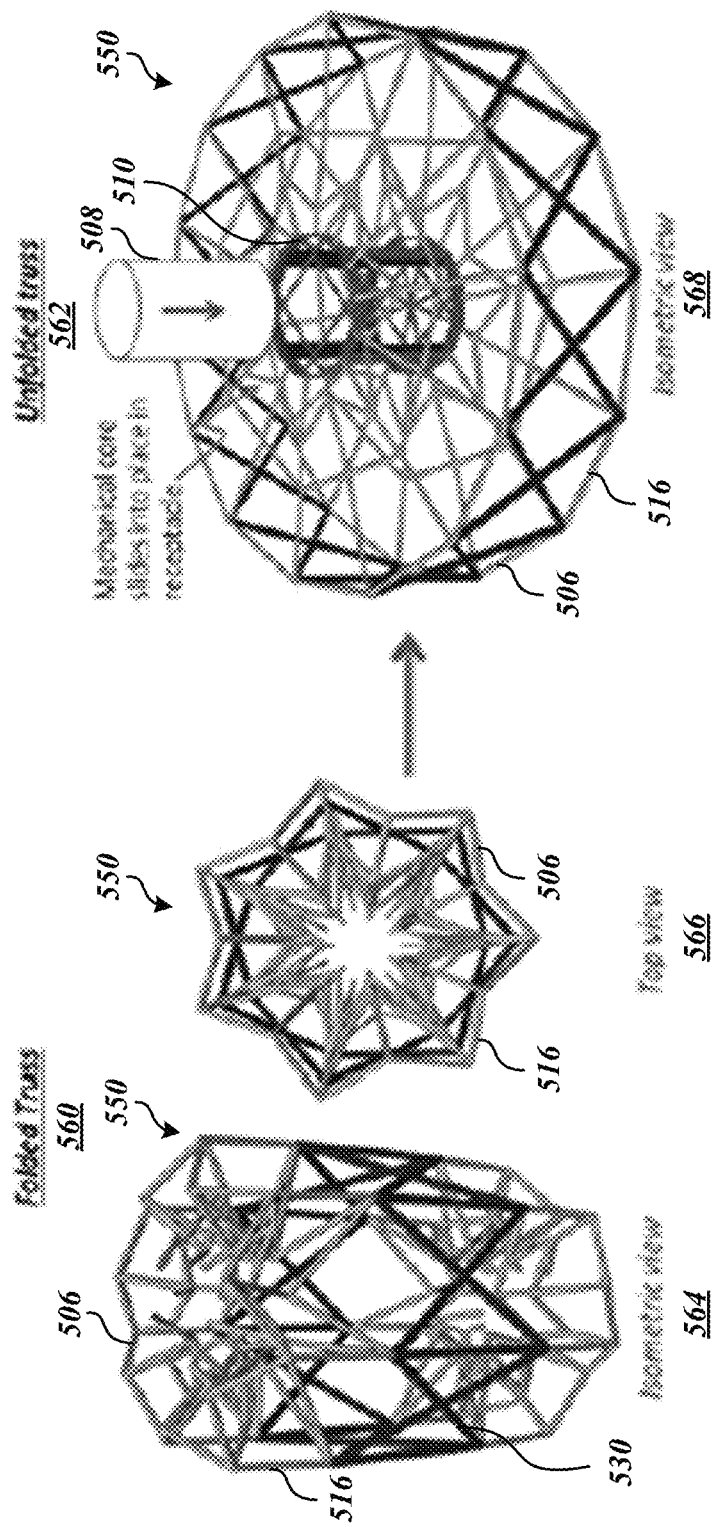

FIG. 5D depicts an isometric view 540, a side view 542, and a top view 544 of an "ellipsoid" embodiment of an aquatic animal containment system 550. In some embodiments, truss 516 may include diagonal braces 530 that may be configured to, among other things, provide stability during deployment against hydrodynamic tidal forces and/or the like. FIG. 5E depicts an isometric view 564 and a top view 566 of a folded truss 560 and an isometric view 568 of an unfolded truss 560 of a "rectangular cylinder" embodiment of an aquatic animal containment system 550. As shown in FIGS. 5A-5F, truss system 516 may be foldable to facilitate transportation, deployment, and/or the like.

In some embodiments, aquatic animal containment system 150 may be moored or anchored via a mooring or anchor 212. In various embodiments, aquatic animal containment system 150 may be coupled to mooring 212 via a mooring cable 222. In some embodiments, anchor 212 may be formed of metal and/or concrete. Winch 224 may operate to move aquatic animal containment system 150 up and down mooring cable 222 to various depths 220 beneath the surface of the water. In some embodiments, aquatic animal containment system 150 may be maintained under water using different components, such as a ballast system with one or more ballast containers attached to aquatic animal containment system 150 that may operate to move aquatic animal containment system 150 up and down to different depths 220. In some embodiments, Four variable buoyancy units embedded in the outer wall of the main growout tank will provide a net positive buoyance.

Hull 206 attitude and trim may be monitored by inclinometers and accelerometers, for example, of position management system 126. In some embodiments, position management system 126 may use inclinometers to regulate pitch, for example, through pneumatic alterations in variable buoyancy units, for example, positioned in the two axes. In various embodiments, inclinometers may sense trim in pitch and roll planes while accelerometers will sense hull motion due to wave action.

In exemplary embodiments, trim control may be implemented at least in part via pneumatic variable buoyancy units to maintain trim in pitch and roll planes. For example, aquatic animal containment system 105 may be trimmed to slight positive buoyancy with biases in the two planes used for adaptive control. In some embodiments, depth and stability control may be implemented by holding the aquatic animal containment system at the optimal depth for thermal optimization of growth of stocks and/or if hull 206 begins moving due to wave action, the system may descend until motion decreases.

In various embodiments, mechanical core 208 may include a power management system 122 that may be a combination of batteries and power supplies. In some embodiments, power management system 122 may include a lithium ion polymer battery bank (for instance, a 3.2 kW·hr batter bank) on site to provision the systems. Such an energy system may be small enough to fit into a bottom-mounted Delrin pressure, for example, housing and may be kept charged through a combination of wave energy harvesting (for instance, an Archimedes wave swing) supplemented by solar power. Should the sea be flat calm and overcast, a fully charged system may keep operating for 33 hours without supplementary power.

In some embodiments, a gas-powered generator or fuel cell may be used as emergency power responsive to renewable energy sources providing no or insufficient power. In various embodiments, a gas-powered generator and corresponding fuel bladder may be arranged in or on the mechanical core 280. As aquatic animal containment system 150 will be able to operate at reduced depth during such conditions, a retractable snorkel may be extended to the surface and the generator will be used to charge the batteries. Check valves on the snorkel and exhaust will prevent flooding. When the batteries have been fully charged and/or wave power or other renewable energy sources are adequate, the generator may shut down.

The power management system 122 may power aquatic animal containment system via various methods. For example, power management system may be integrated into a coastal windfarm system to obtain at least a portion of the operating energy. Another example includes use of wave energy harvesting technology integrated into aquatic animal containment system, such as into hull 206. A non-limiting example, of a wave energy harvesting device is the Archimedes Wave Swing (AWS), which is a cylindrical air-filled chamber. The waves move the lid of this chamber, called the floater, in vertical direction with respect to the bottom cylinder, which is fixed in the hull. When a wave is above the AWS, the higher water pressure reduces the AWS volume. When a wave trough is above the AWS, the volume increases because of the air inside the AWS expands from the lower hydrostatic head. From this linear motion caused by air expanding and contracting and thus driving buoyancy changes in the AWS, energy can be extracted and converted into electrical energy. The energy from a wave energy harvester, such as an AWS, may operate various components such as a pump. For example, a parallel hydraulic pump may drive an aerator and internal tank circulation. By appropriate tuning of the wave and linear generator interactions, the charging process can be optimized. An AWS may be configured such that the floater systems 1) is not ratcheted up, or down, to the end of its travel from the natural instabilities that arise with any gas-filled system experiencing depth changes from waves in shallow or deep water, that the floater not slam into silo at the end of its travel path, which can be controlled by the back EMF from the generator, augmented by passive water dampers and 2) that the electric linear generator be scaled appropriately to the forces induced by the wave motion. In some embodiments, an AWS component may implement a control scheme using feedback linearization control (a non-linear method).

Figure 6:
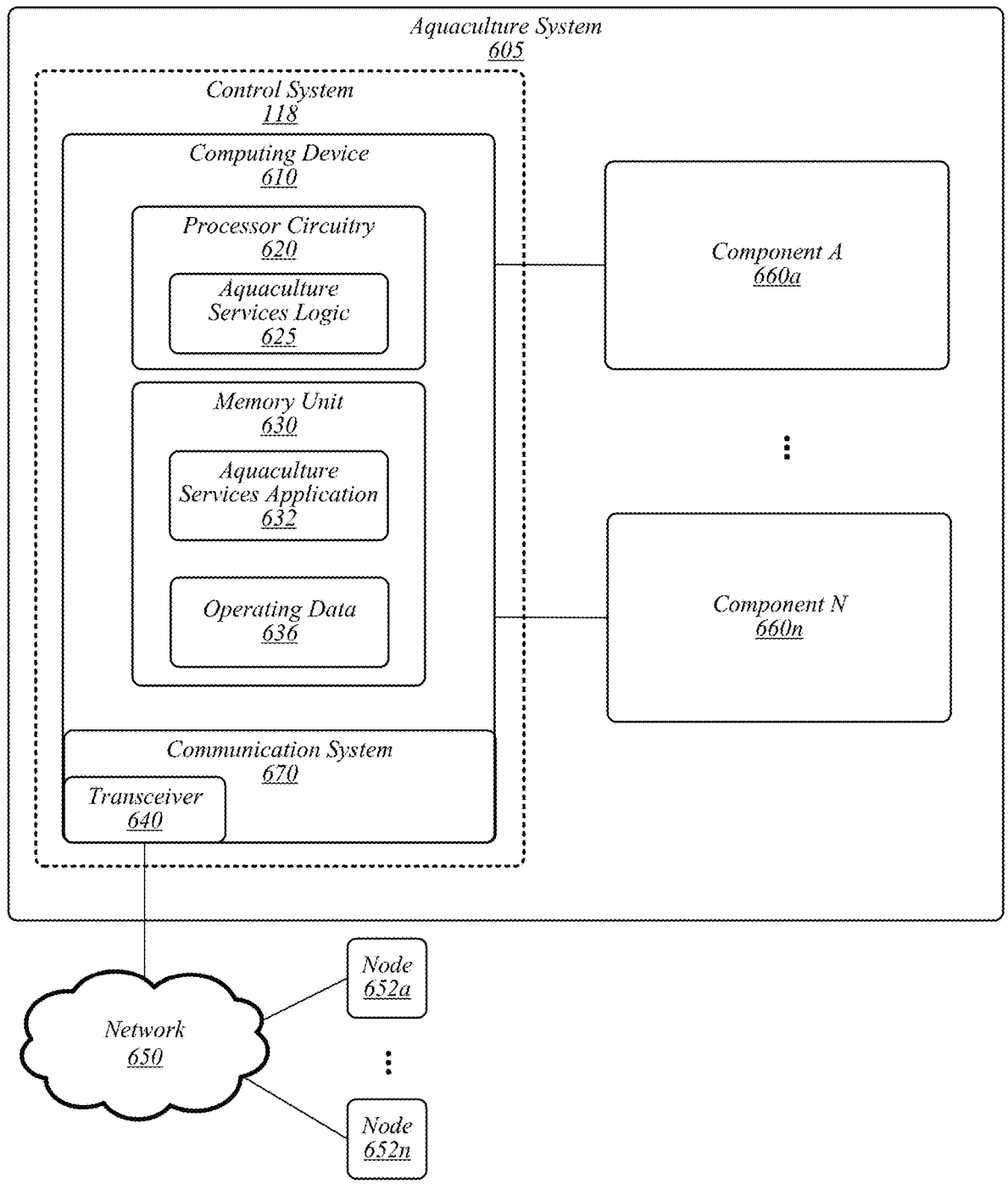
FIG. 6 illustrates an embodiment of a third operating environment.

In various embodiments, aquaculture system 105 may include a control system 118. FIG. 6 illustrates an example of an operating environment 600 that may be representative of some embodiments. As shown in FIG. 1, operating environment 600 may include control system 118 operative to manage various functions of aquaculture system 605. Control system 118 may receive operating data 636 from various components 660a-n including, without limitation, sensors, monitors, computing devices (for instance, computing devices of remote operators), video recorders, image recorders, sound recorders, motion detectors, temperature devices, salinity devices, depth sensors, accelerometers, inclinometers, water quality devices, feeding system 110, aeration system 112, water quality system 114, harvesting system 116, power management system 122, performance management system 124, position management system 126, components thereof, and/or the like.

In various embodiments, control system 118 may include computing device 610 communicatively coupled to components 660a-n or otherwise configured to receive and store operating data 636 associated with components 660a-n. In general, operating data 636 may include any type of data generated, detected, or otherwise associated with components 660a-n. In some embodiments, computing device 610 may be operative to control, monitor, manage, or otherwise process various operational functions of aquaculture system 605 and/or components thereof based on operator control signals and/or operating data 636.

In some embodiments, computing device 610 may be operative to provide information to a location, such as nodes 652a-n, on a network 650 through a secure or authenticated connection. In some embodiments, computing device 610 may be or may include a stand-alone computing device, such as a personal computer (PC), server, tablet computing device, cloud computing device, embedded computing device, logic device, and/or the like. Embodiments are not limited in this context. As shown in FIG. 1, computing device 610 may include processing circuitry 620, a memory unit 630, a communication system 670, and a sonar or WiFi transceiver 640.

Processing circuitry 620 may be communicatively coupled to memory unit 630, communication system 670, and/or transceiver 640. Processing circuitry 620 may include and/or may access various logic for performing processes according to some embodiments. For instance, processing circuitry 620 may include and/or may access aquaculture logic 625. In general, aquaculture logic 625 can be circuitry arranged to perform specific operations related to providing services to manage operational aspects of aquaculture system 605. Processing circuitry and/or aquaculture logic 625, or portions thereof, may be implemented in hardware, software, or a combination thereof. As used in this application, the terms "logic, "component," "layer," "system," "circuitry," "decoder," "encoder," and/or "module" are intended to refer to a computer-related entity, either hardware, a combination of hardware and software, software, or software in execution, examples of which are provided by the exemplary computing architecture 1100. For example, a logic, circuitry, or a layer may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, application specific integrated circuits (ASIC), programmable logic devices (PLD), digital signal processors (DSP), field programmable gate array (FPGA), a system-on-a-chip (SoC), memory units, logic gates, registers, semiconductor device, chips, microchips, chip sets, software components, programs, applications, firmware, software modules, computer code, combinations of any of the foregoing, and/or the like.

Although aquaculture logic 625 is depicted in FIG. 6 as being within processing circuitry 620, embodiments are not so limited. For example, aquaculture logic 625 may be located within an accelerator, a processor core, an interface, an individual processor die, implemented entirely as a software application (for instance, aquaculture services application 632) and/or the like.

In some embodiments, processing circuitry 620 may be or may include a MacMini on each of systems 110, 112, 114, 116, 118, 120, 122, 124, and/or 126, for example, that may support a management platform, such as LabView for supervisory control. In such embodiments, distributed Ardunios may be used to control individual systems 110, 112, 114, 116, 118, 120, 122, 124, and/or 126 through the MacMini.

In some embodiments, for example, overall control of subsystems may be mediated through a central LabView or similar instrument that both polls subsystems as well as responds to external and internal interrupts. In various embodiments, telemetry through Wi-Fi and Sonar may mediate external monitoring and interaction with operators. A set of internal timers may dispatch subsystems for stock and water quality monitoring, power management, feeding, and/or other functions. Motion analysis software may monitor movements of stock and issue interrupts based on movement and behavior.

Memory unit 630 may include various types of computer-readable storage media and/or systems in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In addition, memory unit 630 may include various types of computer-readable storage media in the form of one or more lower speed memory units, including an internal (or external) hard disk drive (HDD), a magnetic floppy disk drive (FDD), and an optical disk drive to read from or write to a removable optical disk (e.g., a CD-ROM or DVD), a solid state drive (SSD), and/or the like.

Memory unit 630 may store an aquaculture services application 632 that may operate, alone or in combination with aquaculture logic 625, to perform various services to facilitate operations of aquaculture system 605 and/or components thereof. For example, aquaculture services application 632 may operate an aeration system based on operator commands and/or operating data 636. In another example, aquaculture services application 632 may change the depth of aquatic animal containment system 105 based on operator commands and/or operating data 636. For instance, an operator may set a water temperature parameter to a specified value to indicate a temperature of water that the aquatic animal containment system should be positioned in. Aquaculture services application 632 may access temperature data and determine that the current water temperature is outside of range. Aquaculture services application 632 may instruct position management system 126 (for example, a winch and/or ballast system) to change the depth of aquatic animal containment system 150. In a further example, aquaculture services application 632 may generate an alert for transmission to a remote monitoring system if an alarm condition (for instance, temperature, turbulence, animal activity, system failure, and/or the like) is detected. Embodiments are not limited in this context.

In some embodiments, communication system 670 may use various wired and wireless communication protocols for communicating among various systems (for instance, systems 110, 112, 114, 116, 118, 120, 122, 124, and/or 126) of aquaculture system 105 and/or a remote control operations system. For example, each of systems 110, 112, 114, 116, 118, 120, 122, 124, and/or 126 may operate as an Internet of Things (IoT) object.

In some embodiments, communication system 670 may include or use an acoustic link based on multi-FFT (multiple Fast Fourier transform) demodulation, applied together with differentially coherent detection in an orthogonal frequency division multiplexing (OFDM) setting. Differential detection, applied across OFDM carriers as opposed to blocks in time, has an advantage of simultaneously supporting frequency coherence needed for implicit channel estimation, and high bandwidth efficiency (high data rate within a limited acoustic bandwidth). Multi-FFT demodulation meanwhile provides improved performance on time-varying channels (such as acoustic channels) that are prone to inter-carrier interference due to the loss of carrier orthogonality. This technique can further be coupled with higher-level methods for improved data-link performance, for example, that utilizes random linear packet coding to enhance successful packet reception on links with long delay (such as acoustic links). Random linear packet coding is based on grouping the information-bearing packets into groups and encoding each group on a packet level (as opposed to bit level) basis. This method does not replace the bit-level channel coding, but can work together with it to improve the link reliability. It can be applied with or without feedback; in the former case, it also supports efficient power control and automatic repeat request (ARQ) techniques.

The system is designed to be multi-unit, where a number of different fish raising units are placed in adjacent spaces, communicating to shore and receiving machine instructions through RF or other communication protocols. The real-time data feeds may be collected, filtered, and placed into databases. The database architecture may include a data dictionary designed specifically for machine control, as well as to track fish production, and programs for combining data for daily, weekly, and longer-term reporting. Manual or semi-automated inputs to the database for feedstock resupply, servicing, and harvesting may also be employed. This is a process control database architecture. The systems architecture also features a workflow management tool for the overall structure and its component systems, with event monitoring, alarms, and response. Systems may allow for the design of management reports encompassing unit installation, testing, ongoing supply of food, water and fish quality monitoring, fish harvesting and unit servicing.

Figure 7:
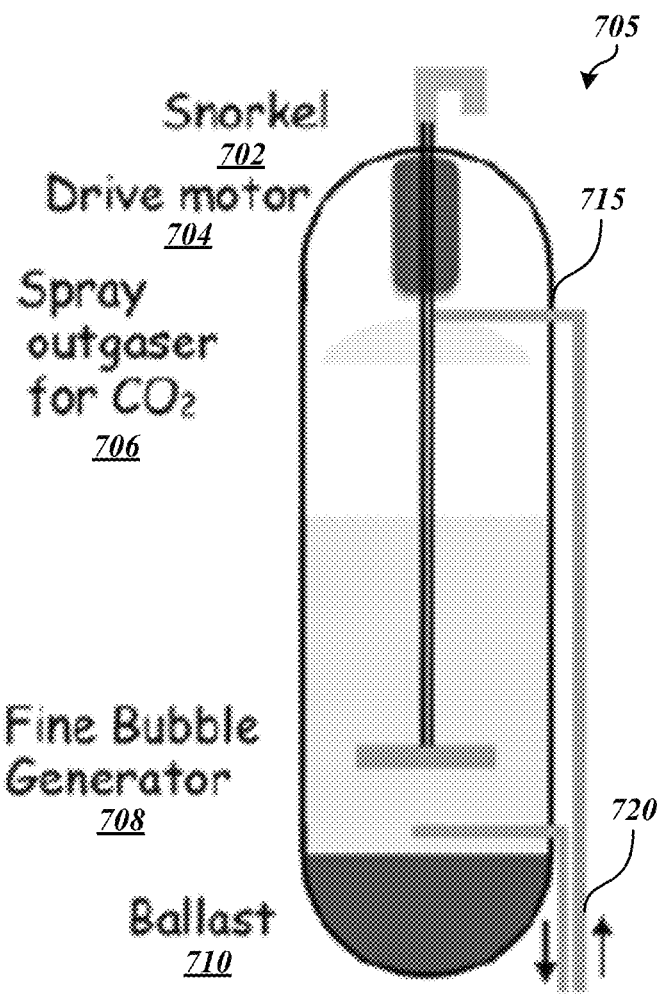
FIG. 7 illustrates an embodiment of an aeration system.

FIG. 7 depicts an aeration system according to some embodiments. As shown in FIG. 7, an aeration system 705 may include a snorkel, drive motor 704, spray outgasser (for $CO_2$) 706, fine bubble generator 708, and/or a ballast 710.

Aeration will play multiple roles in the operation of aquaculture system 105. For example, aeration system 705 may provide optimal $O_2$ levels (~5 mg/L), remove $CO_2$, and mediate circulation of water. Aeration demands will depend on temperature and the maturity and resultant biomass of stocks. The facility to circulate air will also depend on the depth at which the system is held and will also affect power requirements for pumping.

In some embodiments, aeration system 705 may include an air turbine impeller optimized for fine bubble diffusion, to supersaturate the water with air. To reduce the energetic costs of pumping air to depth, aeration may be performed in a buoy on the surface and tank water may be recirculated through the aerator buoy with a hydraulic pump. The small bubbles created in this process average may average about 0.025 mm in diameter. The small size of the bubble and the low-pressure gas it holds create a small buoyancy force. This buoyancy force is so small that it is less than the surrounding surface tension of the water. The bubble may not rise to the surface, but implode in the fluid and rapidly dissolve all the gases in the water. This makes all of the oxygen in the bubble available to be dissolved in the liquid as needed and provides much higher oxygen tensions than possible with simple aeration. In addition, the impeller also generates macro (~1 mm) bubbles that will scrub $CO_2$ from the water. In some embodiments, bubble generator 708 may be or may include air stones and/or an ultrasound piezoelectric generator that may, for example, eliminate costs of compressing air at depth).

In some embodiments, aeration system 705 may operate using an aeration loop to a surface buoy 715 that both outgases $CO_2$ and saturates water with $O_2$. Fresh air may be drawn through snorkel 702 to bubble generator impeller 708 to oxygenate the water. An umbilicus 720 may tether buoy 715 to the drive motor and circulate the water. In some embodiments, the pump may be arranged in the aquatic animal containment system 150, such as in the mechanical core 208.

Figure 8A:
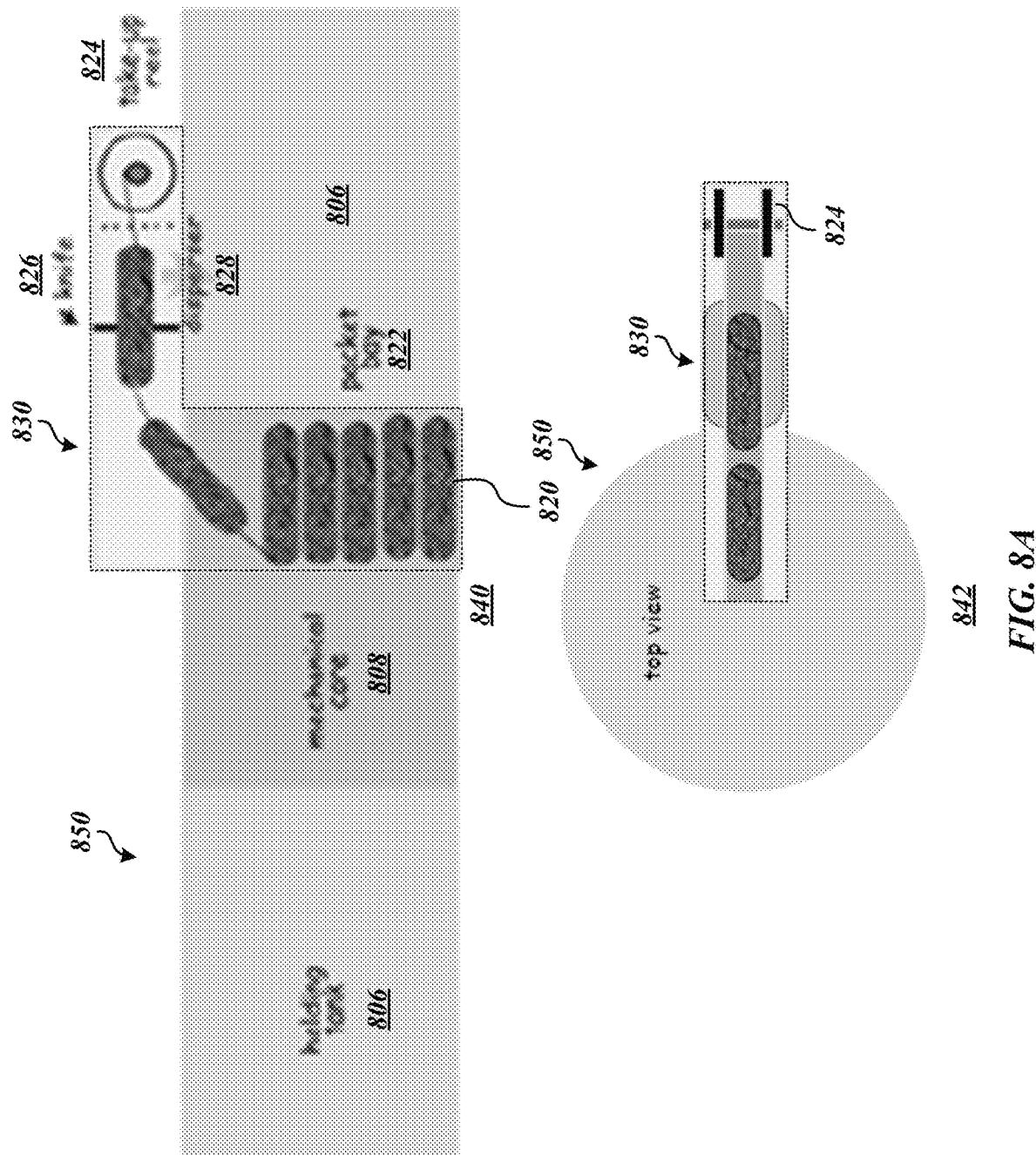
FIGS. 8A and 8B illustrate embodiments of a feeding system.
Figure 8B:
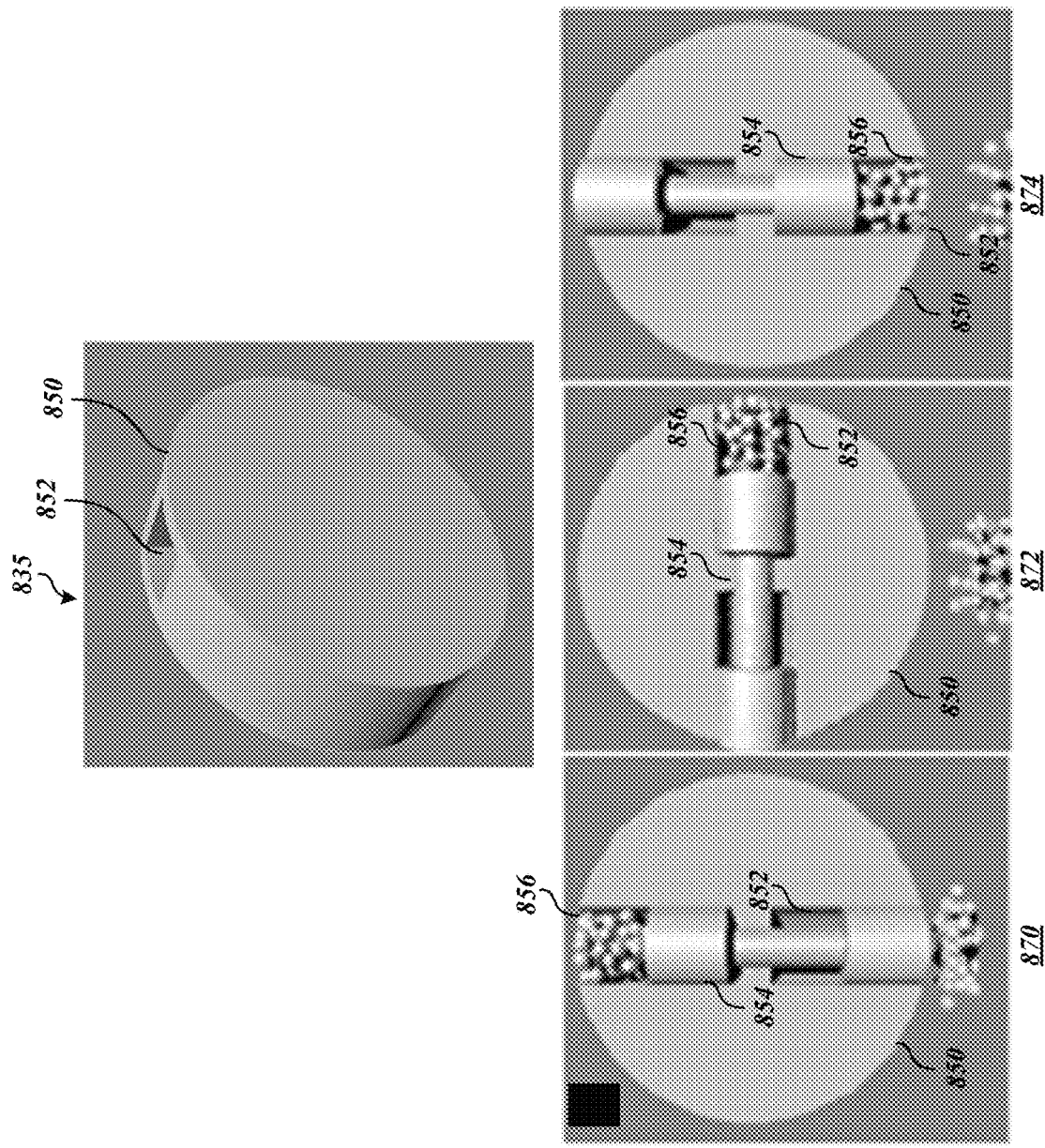

FIGS. 8A and 8B depict a feeding system according to some embodiments. As shown in FIG. 8A, feeding system 830 may operate to deliver food 820 to aquatic animals within hull 206 of aquatic animal containment system 850. In various embodiments, food 820 may include conventional feeds, insect-based protein, combinations thereof, and/or the like. In some embodiments, food 820 may include food particles with their density adjusted so that they sink slowly enough to ensure complete utilization.

Food (for example, food pellets) 820 may be packaged in aliquots in vacuum-sealed bags. The bags may, in turn, be inserted into a long shrink tube and the tube heat shrunk to produce a long strip. The shrink tube may be threaded through a disperser 828 and attached to a take-up reel 824 that may pull the bags through a knife 826 to release their contents into the disperser 828 and accumulate the empty packaging. The dispensing systems may controlled by a stock management system and/or a feeding system 110 managed via control system 118. For example, as energy demands per gram of fish decrease as the fishes grow (allometric scaling of metabolism), feeding system 110 may estimate size daily to compute the optimal ration to prevent food wastage while optimizing growth. Referring to FIG. 8B, therein is depicted a plunger embodiment of a food dispensing system 835 optimized for the growout of fry and juveniles. As shown in FIG. 8B, a food dispenser 850 may include an opening 852. Rotation of food dispenser 850 may cause opening 852 to be exposed such that plunger 854 may push food 856 out of opening. In some embodiments, an aquaculture system may include a plurality of feeding systems and/or dispensers, for example, one for each type or size of food required. In various embodiments, feeding systems and/or dispensers may be used to provide other items within aquaculture system, such as drugs, cleaning materials, and/or the like. In some embodiments, feeding systems may include loading and cleaning mechanisms to load different materials (for instance, a second type of food or an antibiotic) after a first type of material has finished being dispensed.

In some embodiments, stock monitoring may be targeted via a robotic "supervisor" to quantitatively assess the environmental conditions of the holding system and ensure proper operation and continuous telemetry of system parameters. A low-light video system may be integrated to allow regular visual monitoring of the stock. The system may include an underwater webcam that may allow a remote operator to directly oversee the condition of the stock.

A machine-vision system may generate a histogram length distribution function for the target species on a semi-daily basis. Using length-to-biomass regressions available for these species, food required may be computed using allometric scaling. Estimation of the exact amount of required food based on the size (biomass) distribution may minimize food wastage, as well as decomposition load on the bioreactor.

While basic undersea telemetry can be achieved at relatively low bit rates, video transmission requires much higher bit rates on the order of several tens of kilobits per second. To provide sea-to-land telemetry, a surface buoy (for example, a communication buoy or aeration system 202 of FIG. 2) may be used to support an RF Wi-Fi or other wired or wireless link to a shore station. For example, referring to FIG. 2, information may be communicated from sensors, cameras, etc., from mechanical core 208 or other areas of aquatic animal containment system to/from a communication buoy and/or aeration system 202 via various wired or wireless communication protocols (Ethernet, Wi-Fi, sonar). This information may be communicated to/from a communication buoy or aeration system 202 to/from a remote station using the same or different communication protocols. In the event of catastrophic loss of the surface buoy, the system may deploy a secondary wired RF communication buoy. The command center may maintain a virtual control display available to all operators with dashboard type indicators on each virtual RMCS, and alerts initiating specific response processes.

Figure 9:
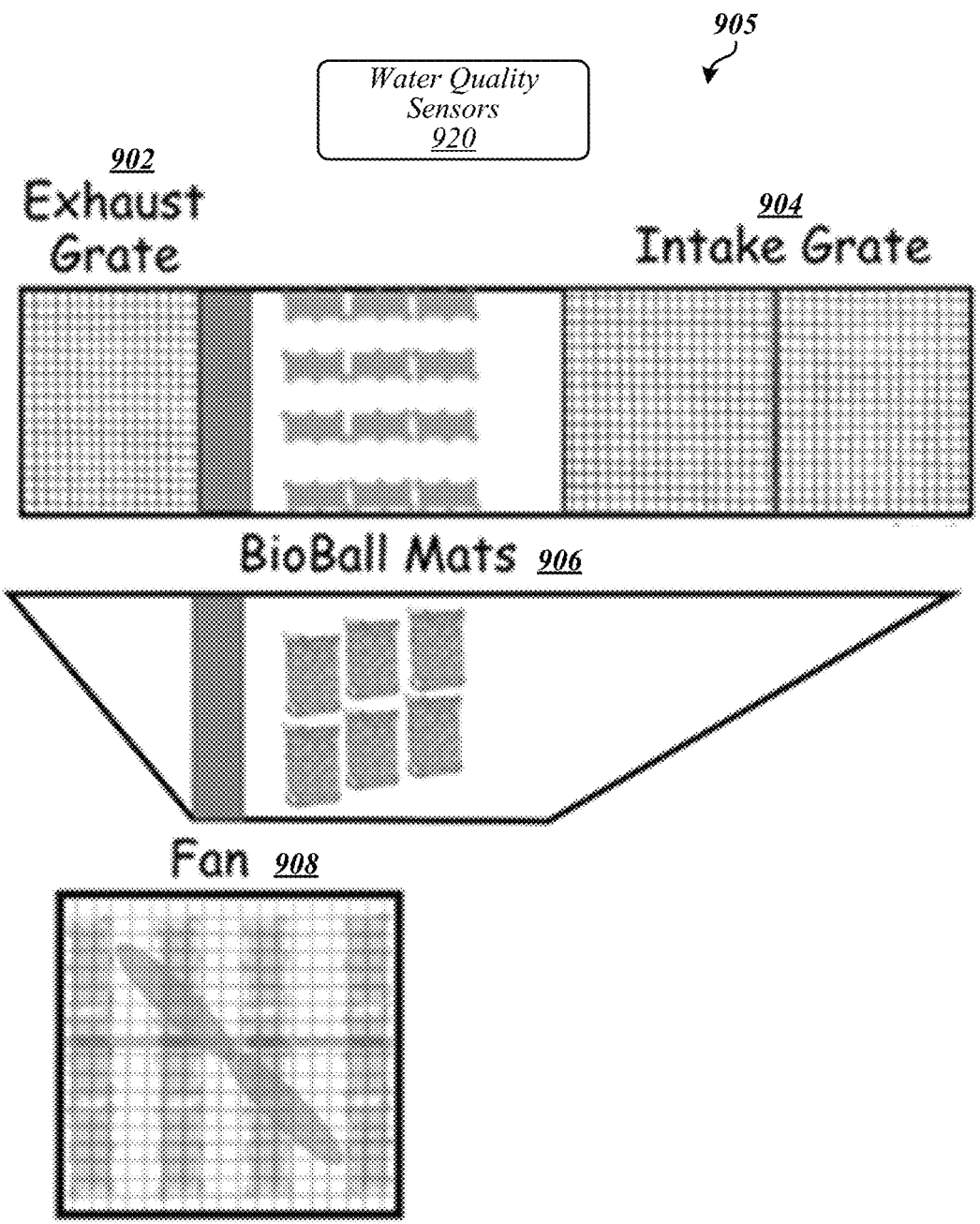
FIG. 9 illustrates an embodiment of a water quality system.

FIG. 9 depicts a water quality management system according to some embodiments. As shown in FIG. 9, water quality management system 905 may include an exhaust grate 902, an intake grate 904, bio ball mats 906, and/or a fan 908.

To assess water quality, some embodiments may employ a water quality sensor system (or an "electronic tongue") 920 that monitors temperature, pH, dissolved Oxygen, Ammonium, nitrate and nitrite. This tongue may include integrated ampiometric coated wire sensors integrated on a monolithic part, for example, through e-Jet printing. Several integrated sensors may be distributed around the main tank to monitor titers and control circulation and aeration.

To minimize energy requirements and explicitly address fish wastes, water quality management system 905 may employ a combination of bio-balls (for instance, spheres formed of tubes that provide a surface area for water-filtering microbial biofilms) and/or ceramic rings 906 that will support nitrifying and denitrifying bacterial biofilms to ultimately break down the wastes to nitrogen. Bio balls (for example, aerobic, for ammonia and/or nitrites) and/or ceramic rings (for example, aerobic and for nitrates) 906 may be housed in long cylindrical mesh bioreactors bags. The bioreactor bags may be suspended vertically from an access port in the upper surface of the main tank and anchored to a pully in the lower surface of the tank so that they can be changed out as necessary during maintenance.

Thus, the bioreactor media may be distributed throughout the tank both vertically and spatially to optimize contact with both the fish and the water. The bioreactor bags will add structure to the tank to mimic underwater plants and enhance welfare of the stocks. Circulation will be produced by movement of the fish as well as by auxiliary fan channel circulators 908 distributed around the tank regulated by the electronic tongue 920 and associated processor.

Figure 10A:
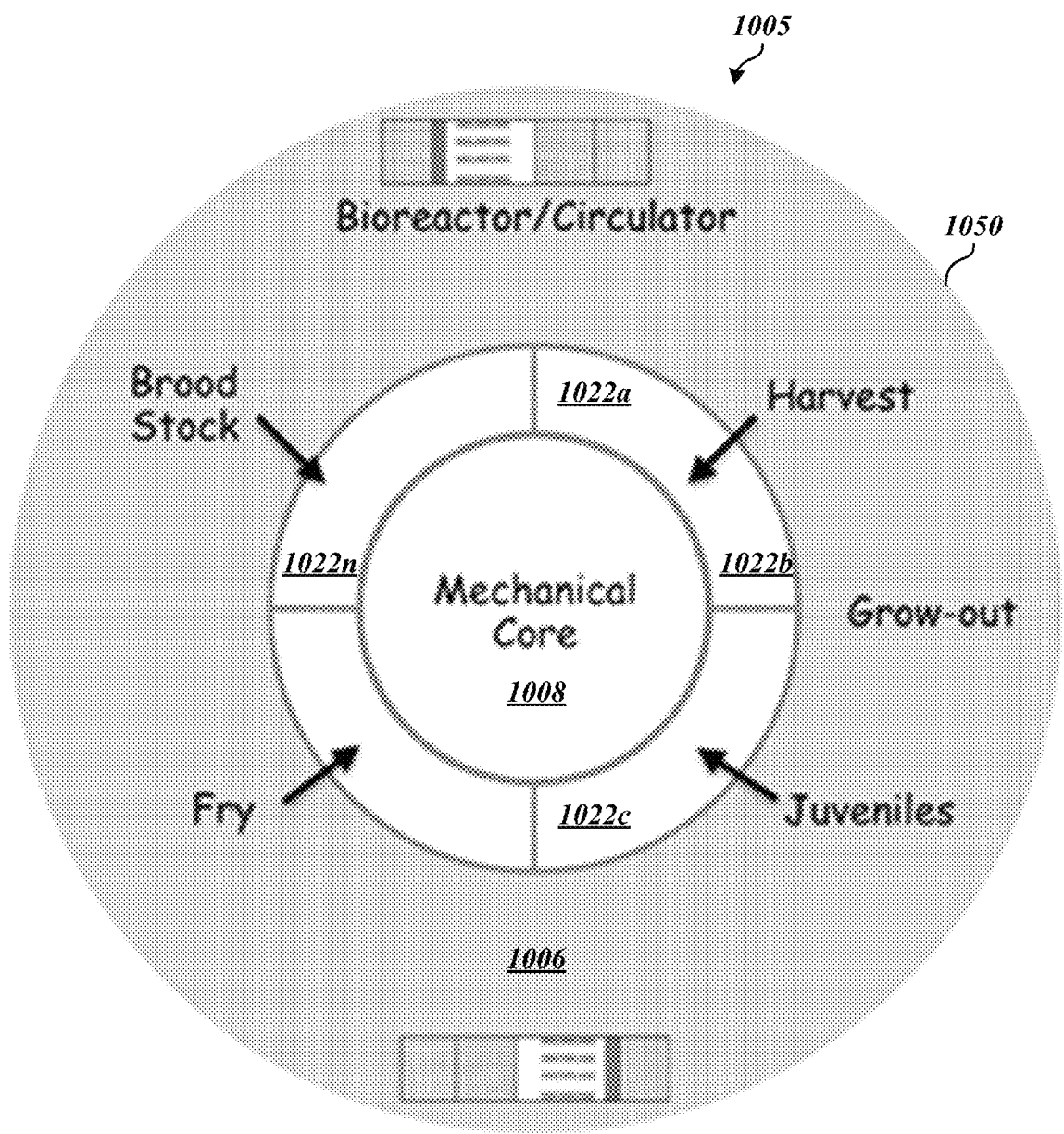
FIGS. 10A and 10B illustrate embodiments of a lifecycle management/harvesting system.
Figure 10B:
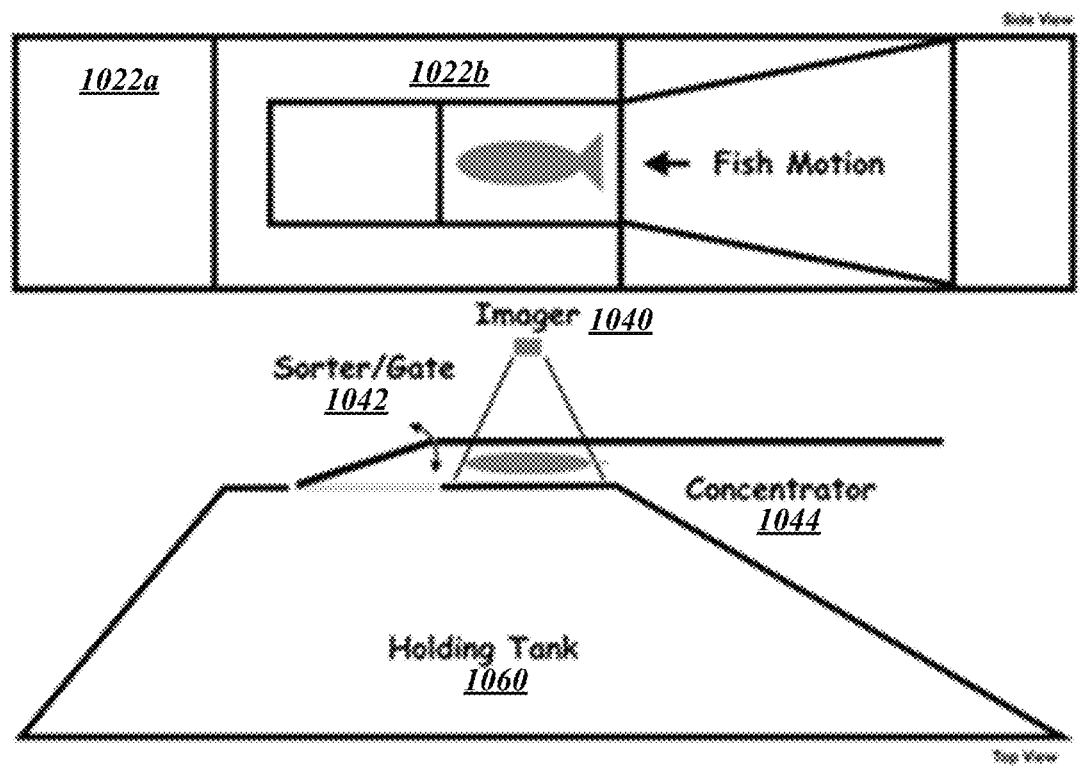

FIGS. 10A and 10B depict a lifecycle management/harvesting system according to some embodiments. As shown in FIG. 10A, a lifecycle management/harvesting system 1005 may include compartments 1022*a-n*. Compartments 1022*a-n* may include selective gates to selective different life stages and/or species of stock. Referring to FIG. 10B, compartments 1022*a-n* may include video selective gates 1042 to permit integrated culture of brood stock, fry, juveniles and adult grow-out and harvesting. Compartments 1022*a-n* may be associated with the inner wall of hull 1006 and/or mechanical core 1008 and may be separately accessible through access ports in the upper surface of hull 1006. Specimen sorting and segregation may be achieved through channels (for example, Plexiglas channels) with an associated video camera 1040. As specimens swim through the channel, they may be imaged in real time and categorized with regard to size, species, or another characteristic and gate 1042 may allow them to with remain or exit the compartment 1022*a-n*.

During harvesting, this process may be reversed and large specimens may be sorted into a harvesting compartment for holding, enhanced grow out and harvest. A fry compartment may have a nested cultivator for species-specific fry prey (brine shrimp or rotifers, etc.) to permit feeding with developmentally appropriate live prey. A smaller video sorter may allow fry to graduate to a juvenile compartment with and age/species specific food dispenser and ultimately for juveniles to be sorted to the main grow out tank 1060.

Figure 11:
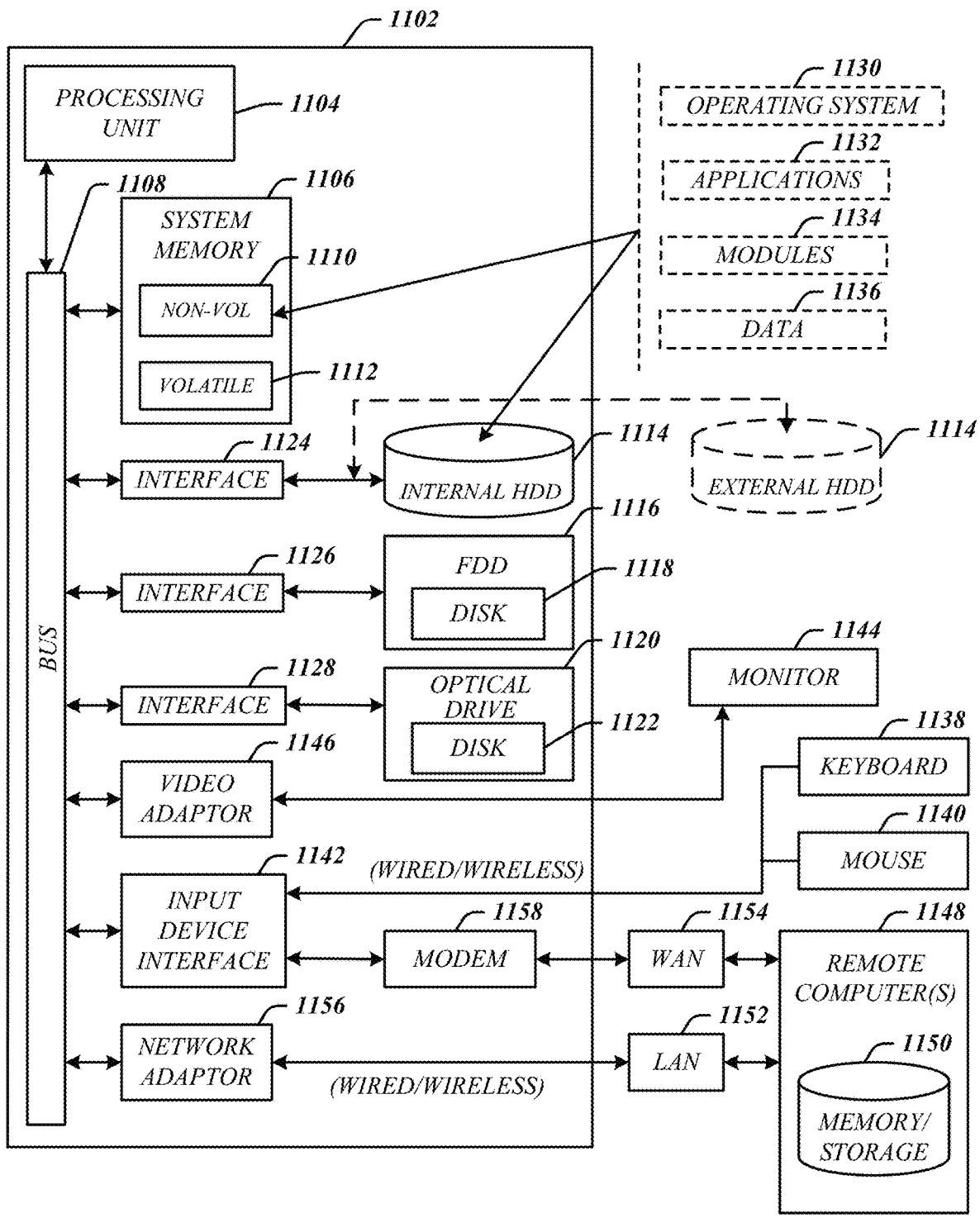
FIG. 11 illustrates an embodiment of a computing architecture.

FIG. 11 illustrates an embodiment of an exemplary computing architecture 1100 suitable for implementing various embodiments as previously described. In various embodiments, the computing architecture 1100 may comprise or be implemented as part of an electronic device. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 13114 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components to operate an aquaculture system according to some embodiments.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An aquaculture system, comprising:
    (a) an aquatic animal containment system operative to hold a population of aquatic animals within a body of water, the aquatic animal containment system comprising a fluid-impermeable hull, the fluid-impermeable hull being a closed containment structure, the fluid-impermeable hull:
        (i) configured to be submerged beneath a surface of the body of water and to contain a contained water volume; and
        (ii) having a receptacle configured to receive a mechanical core, the mechanical core configured to store at least a part of one of a plurality of subsystems to implement at least one function of the aquaculture system; and
    (b) an aeration system, the aeration system comprising:
        (i) an aeration buoy operable to perform aeration of water from the contained water volume in the fluid-impermeable hull, the aeration buoy at least partially above a surface of the body of water, the aeration to manage levels of $CO_2$ and $O_2$ for the aquatic animal containment system;
        (ii) an umbilicus coupled to the aeration buoy and to the fluid-impermeable hull, the umbilicus providing a fluid circulation path between the aeration buoy and the contained water volume in the fluid-impermeable hull; and
        (iii) a pump in fluidic communication with the umbilicus and operable to cause the contained water to circulate along the fluid circulation path.

2. The aquaculture system of claim 1, further comprising a mooring coupled to the fluid-impermeable hull via a mooring cable to anchor the aquaculture system.

3. The aquaculture system of claim 1, the at least one subsystem comprising at least one of a feeding system, an aeration system, a water quality system, a life cycle management system, a harvesting system, and a power management system.

4. The aquaculture system of claim 1, further comprising a position management system operative to move the fluid-impermeable hull to a deeper depth based on wave activity of the body of water.

5. The aquaculture system of claim 1, further comprising a position management system comprising a winch operative to move the fluid-impermeable hull up and down a mooring cable to adjust the depth.

6. The aquaculture system of claim 1, wherein the at least one subsystem comprises a feeding system to provide food to the population of aquatic animals, the feeding system operative to move a packaged aliquot of food pellets to contact a knife to release the food pellets into a dispenser to the fluid-impermeable hull.

7. The aquaculture system of claim 1, wherein the fluid-impermeable hull is formed of a foldable truss.

8. The aquaculture system of claim 1, wherein the aeration buoy comprises an outgasser configured to remove $CO_2$ from water circulated along the fluid circulation path and a bubble generator configured to generate air bubbles into the water circulated along the fluid circulation path to provide the $O_2$ and to scrub the $CO_2$ from the contained water.

9. The system of claim 8, wherein the outgasser is a spray outgasser, and further wherein the bubble generator is configured to produce the air bubbles in a form of microbubbles having a buoyancy force less than the surface tension of the surrounding water.

10. The system of claim 9, wherein the fluid circulation path is an aeration loop that is defined in part by an intake tube for providing water from the contained water volume to the aeration buoy, and a return tube for returning aerated water to the contained water volume.

11. The system of claim 10 wherein the pump is located at the aeration buoy.

12. The system of claim 10 wherein the pump is located at the mechanical core.

13. The system of claim 1 further comprising a snorkel extending from the aeration buoy to above the surface of the body of water and configured to provide air to the aeration buoy for use in aerating water from the submerged water volume.

14. The system of claim 1, the aquaculture system further comprising a renewable energy source coupled to at least the pump to enable the pump to operate.

15. A method of aquaculture farming, the method comprising:
    (a) placing an aquatic animal containment system in a body of water, the aquatic animal containment system operative to hold a population of aquatic animals and comprising a fluid-impermeable hull, the fluid-impermeable hull being a closed containment structure, the fluid-impermeable hull:
        (i) being submerged beneath a surface of the body of water and containing a contained water volume; and
        (ii) having a receptacle configured to receive a mechanical core, the mechanical core configured to store at least a part of one of a plurality of subsystems to implement at least one function of an aquaculture system associated with the aquatic animal containment system; and
    (b) managing levels of $CO_2$ and $O_2$ for the aquatic animal containment system via an aeration system, the aeration system comprising:
        (i) an aeration buoy to perform aeration of water from the submerged water volume in the fluid-impermeable hull, the aeration buoy at least partially above a surface of the body of water;
        (ii) an umbilicus coupled to the aeration buoy and to the fluid-impermeable hull, the umbilicus providing a fluid circulation path between the aeration buoy and the contained water volume in the fluid-impermeable hull; and
        (iii) a pump in fluidic communication with the umbilicus to circulate water along the fluid circulation path.

16. The method of claim 15, the aquatic animal containment system comprising a mooring coupled to the fluid-impermeable hull via a mooring cable to anchor the aquaculture system.

17. The method of claim 15, the at least one subsystem comprising at least one of a feeding system, an aeration system, a water quality system, a life cycle management system, a harvesting system, and a power management system.

18. The method of claim 15, wherein the position management system is operative to move the fluid-impermeable hull to a deeper depth based on wave activity of the body of water.

19. The method of claim 15, wherein the position management system includes a winch operative to move the fluid-impermeable hull up and down a mooring cable to adjust the depth.

20. The method of claim 15, wherein the at least one subsystem includes a feeding system to provide food to the population of aquatic animals, the feeding system operative to move a packaged aliquot of food pellets to contact a knife to release the food pellets into a dispenser to the fluid-impermeable hull.

21. The method of claim 15, wherein the fluid-impermeable hull is formed of a foldable truss.

22. The method of claim 15, wherein the aeration buoy comprises a bubble generator configured to generate air bubbles into water circulated along the fluid circulation path to provide $O_2$ and to scrub $CO_2$ from water.

* * * * *